United States Patent [19]
Hosokawa

[11] Patent Number: 5,519,551
[45] Date of Patent: May 21, 1996

[54] APPARATUS AND METHOD FOR PREVENTING AND CORRECTING TAPE LOOSENING WHEN THE TAPE FEEDING DIRECTION IS CHANGED

[75] Inventor: Kouichi Hosokawa, Nagaokakyo, Japan

[73] Assignee: Mitsubishi Denki Kabushiki Kaisha, Tokyo, Japan

[21] Appl. No.: 283,155

[22] Filed: Aug. 3, 1994

[30] Foreign Application Priority Data

Aug. 18, 1993 [JP] Japan .................................. 5-204137

[51] Int. Cl.⁶ .................................................. G11B 5/008
[52] U.S. Cl. ........................ 360/96.3; 360/96.5; 360/96.1
[58] Field of Search .................................. 360/96.3, 96.5, 360/96.1

[56] References Cited

U.S. PATENT DOCUMENTS 4,774,604  9/1988  Hayashi et al. ............................ 360/71
5,086,359  2/1992  Tsuchiya ................................... 360/71
5,299,076  3/1994  Park ......................................... 360/85

FOREIGN PATENT DOCUMENTS 0390433  10/1990  European Pat. Off. .
4021601   7/1991  Germany .
3132956   6/1991  Japan .
2257560   1/1993  United Kingdom .

Primary Examiner—A. J. Heinz
Assistant Examiner—Adriana Giordana

[57] ABSTRACT

A magnetic recording/reproducing apparatus includes a pulling unit for pulling an idler gear to switch the idler gear between tape reels and thereby transmit rotation power to one of the tape reels and a winding unit for taking-up loose magnetic tape by rotating one of the tape reels using stored elastic energy.

33 Claims, 21 Drawing Sheets

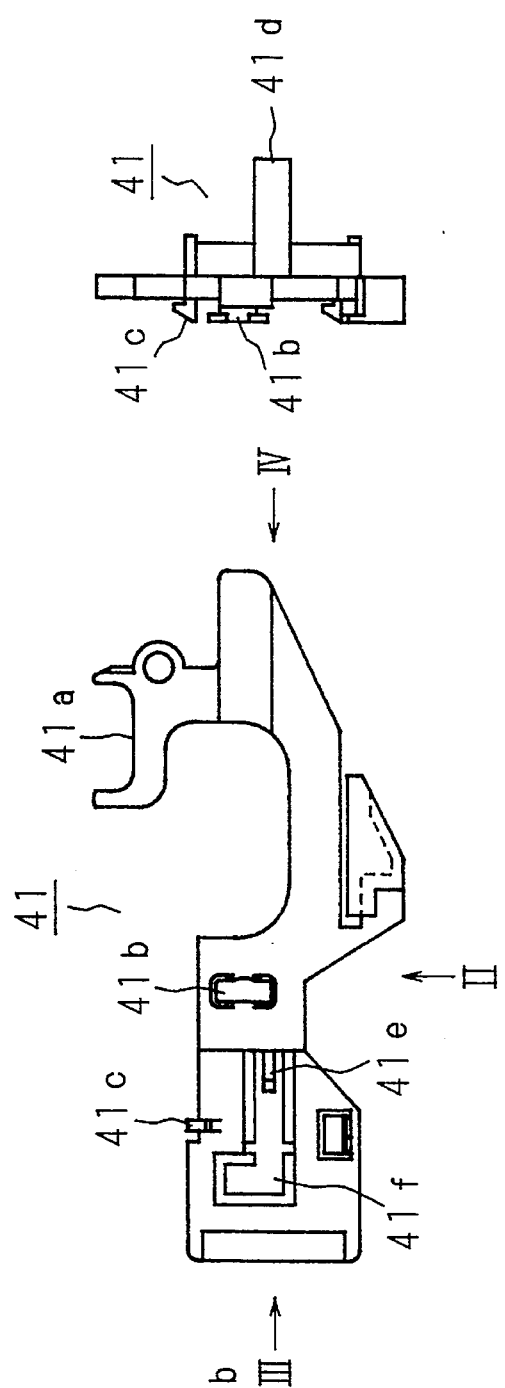
FIG. 11A
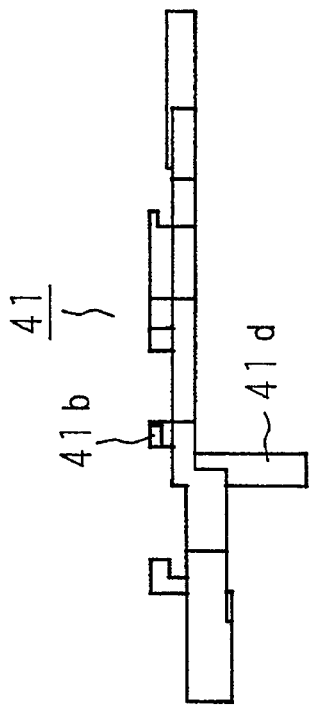
FIG. 11D
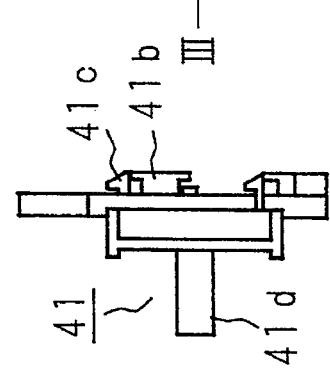
FIG. 11C
FIG. 11B

FIG. 14

CAPSTAN MOTOR DRIVING SYSTEM

CAPSTAN MOTOR 25
|
CAPSTAN BELT 27
|
PULLEY BELT 28
|
PULLEY GEAR 30
|
GEAR IDLER UNIT 29
|
TAKE-UP REEL DRIVING GEAR 11
AND SUPPLY REEL DRIVING GEAR 12

APPARATUS AND METHOD FOR PREVENTING AND CORRECTING TAPE LOOSENING WHEN THE TAPE FEEDING DIRECTION IS CHANGED

BACKGROUND OF THE INVENTION

1. Field of the Invention

The present invention relates to a magnetic recording/reproducing apparatus in which a magnetic tape is changed (e.g. from forward to reverse).

2. Description of Related Art

FIG. 1 and FIG. 2 are a schematic plan view and a rear view of the major part of a conventional magnetic recording/reproducing apparatus, respectively. A main plate 51 in a practically rectangular shape is provided, at an appropriate position (an upper left port, ion in FIG. 1), with a rotation drum 18a having a recording/reproducing head. A loading motor 7 is provided on the upper right portion of the main plate 51. On both the sides of the rotation drum 18a are provided tape guide grooves 9a and 10a through which tape guides 9 and 10 slide. A supplying reel 12 and a take-up reel 11 are disposed on the lower side and the lower right side of the rotation drum 18a, respectively. The supplying reel 12 and the take-up reel 11 are driven by reel driving gears 44 and 45, respectively. An arm-tension 15 for adjusting the tension of a magnetic tape is mounted on the side of the supplying reel 12.

In the rear view of FIG. 2, a capstan motor 25 is disposed at an upper left portion. The power from the capstan motor 25 is received by an idler gear 29a through a capstan belt 27 and a pulley belt 28, and is further transmitted to the take-up reel driving gear 45 on the side of the take-up reel 11 or the supply reel driving gear 44 on the side of the supply reel 12 through a idler gear 29b coaxially rotatable with the idler gear 29a.

Such a conventional magnetic recording/reproducing device is operated as follows: When the supply reel 12 and the take-up reel 11 are rotated in the forward direction, the power of the capstan motor 25 is received by the idler gear through the capstan belt 27 and the pulley belt 28, and is further transmitted to the reel driving gear 45 on the side of the take-up reel 11 through the idler gear 29b. When the rotation direction is changed from forward to reverse, the capstan motor 25 is rotated in the reverse direction, thereby rotating the pulley belt 28, which is connected to the capstan motor 25 by the capstan belt 27, also in the reverse direction. Then, a gear fixed so as to rotate coaxially with the pulley belt 28 engages with the idler gear 29a, thereby swinging the idler gear 29a (and 29b) toward the supply driving gear 44 on the side of the supply reel 12. Thus, the idler gear 29b that, has engaged with the take-up reel driving gear 45 is forced to engage with the supply reel driving gear 44. As a result, the supply reel 12 is driven to rewind a magnetic tape in the reverse direction.

Since neither the supply reel 12 nor the take-up reel 11 while the idlers gears 29a and 29b are moving between the supply reel driving gear 44 and the take-up reel driving gear 45, the magnetic tape is not rewound in the cassette. The capstan motor 25, however, is still rotating during the movement, and therefore, the magnetic tape continues to be fed. Therefore, the magnetic tape becomes loose, resulting in low tape tension. The tape tension is also varied by the change of the running path of the magnetic tape. When the magnetic tape is loose, noise appears on a reproduced image, thereby degrading the image.

In a conventional apparatus, the tape tension is adjusted by an arm tension 15 so as to prevent the tape from loosening when the tape tension is varied. In such a case, however, the tape still tends to be loose because the length of the running path of the magnetic tape is suddenly changed.

SUMMARY OF THE INVENTION

The present invention is devised in order to solve the above-mentioned problems, and the major object thereof is to provide a magnetic recording/reproducing apparatus provided with mechanism for preventing a tape loosening due to a low tape tension that is caused when the operational direction changes (e.g., from forward to reverse).

The magnetic recording/reproducing device of the invention is characterized by being provided with a winding unit for a tape reel so as to rewind the loose magnetic tape. The winding unit is moved along a guide provided on plate member by, for example, a cam-follower to which power is transmitted from a cam plate. By using this arrangement less tape loosening occurs when a idler gear swings between a take-up reel driver and a supply reel driver.

Further, in order to support the swing of the idler gear, the present apparatus is provided with a pulling unit having a hook for pulling the idler gear from one tape reel driver to the other tape reel driver to thereby switch the rotational driving power from one tape reel to the other tape reel, away from the former tape reel toward the latter tape reel. A first spring is interposed between the plate member and the winding unit, and an elastic force is stored in the first spring when the plate member moves. The winding unit is moved by using the stored elastic force in the first spring. The pulling unit, is moved by power transmitted from a loading motor that pulls the idler gear. The winding unit is integrated with the plate member so as to have the first spring therebetween. The winding unit moves together with the plate member when the plate member is moved along the guide by the cam-follower in accordance with the movement of the cam. As a result, the tape reel is rotated to rewind the loose tape. Thus, the idler gear can be moved more rapidly than ill the case where the idler gear is swung merely by the power transmitted thereto, resulting in less tape loosening.

The above and further objects and features of the invention will more fully be apparent from the following detailed description with accompanying drawings.

BRIEF DESCRIPTION OF THE DRAWINGS

FIG. 11A is a plan view of the pulling unit.

FIG. 11B is a side view of the pulling unit taken from the direction of an arrow II in FIG. 11A.

FIG. 11C is a side view of tile pulling unit taken from the direction of an arrow III in FIG. 11A.

FIG. 11D is a side view of the pulling unit taken from the direction of an arrow IV in FIG. 11A.

FIG. 14 is an explanatory view of a capstan motor driving system.

DESCRIPTION OF THE PREFERRED EMBODIMENTS

The present invention will now be described referring to the accompanying drawings.

Figure 1:
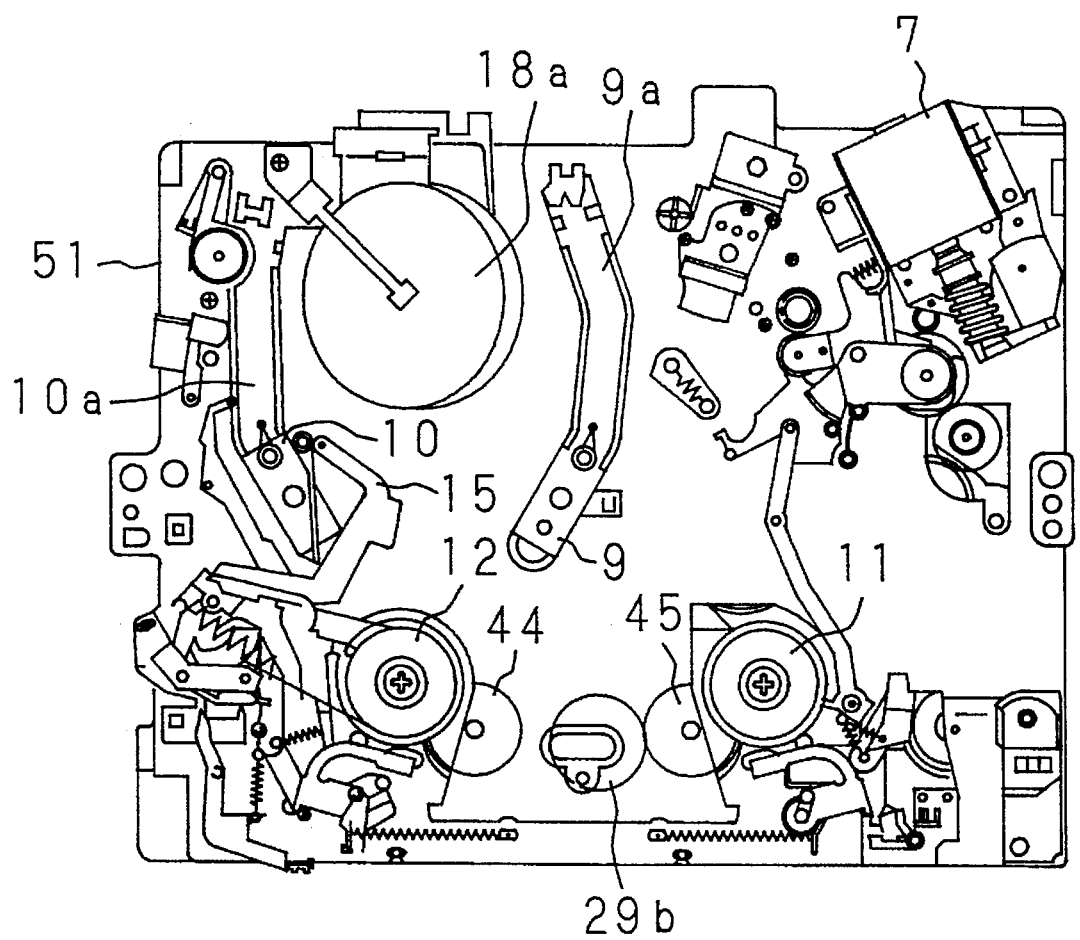
FIG. 1 is a schematic plan view of the major part of a conventional magnetic recording/reproducing apparatus.
Figure 2:
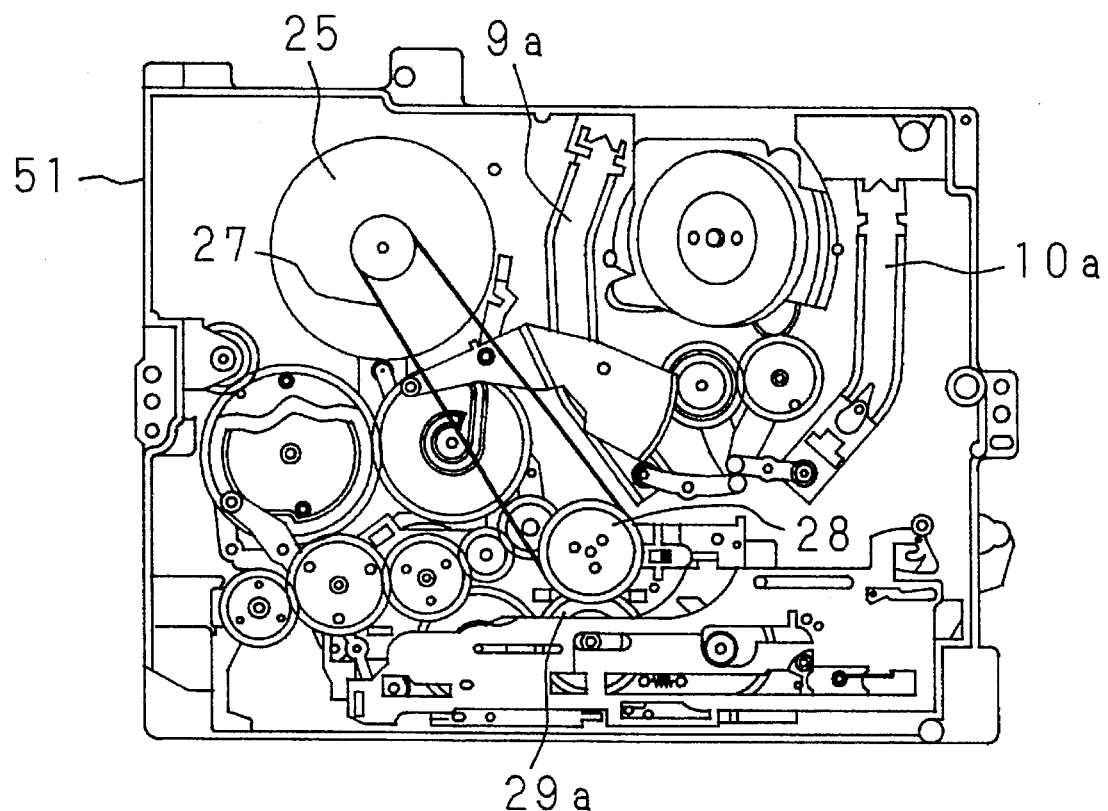
FIG. 2 is a rear view of the major part of the magnetic recording/reproducing apparatus shown in FIG. 1.
Figure 3:
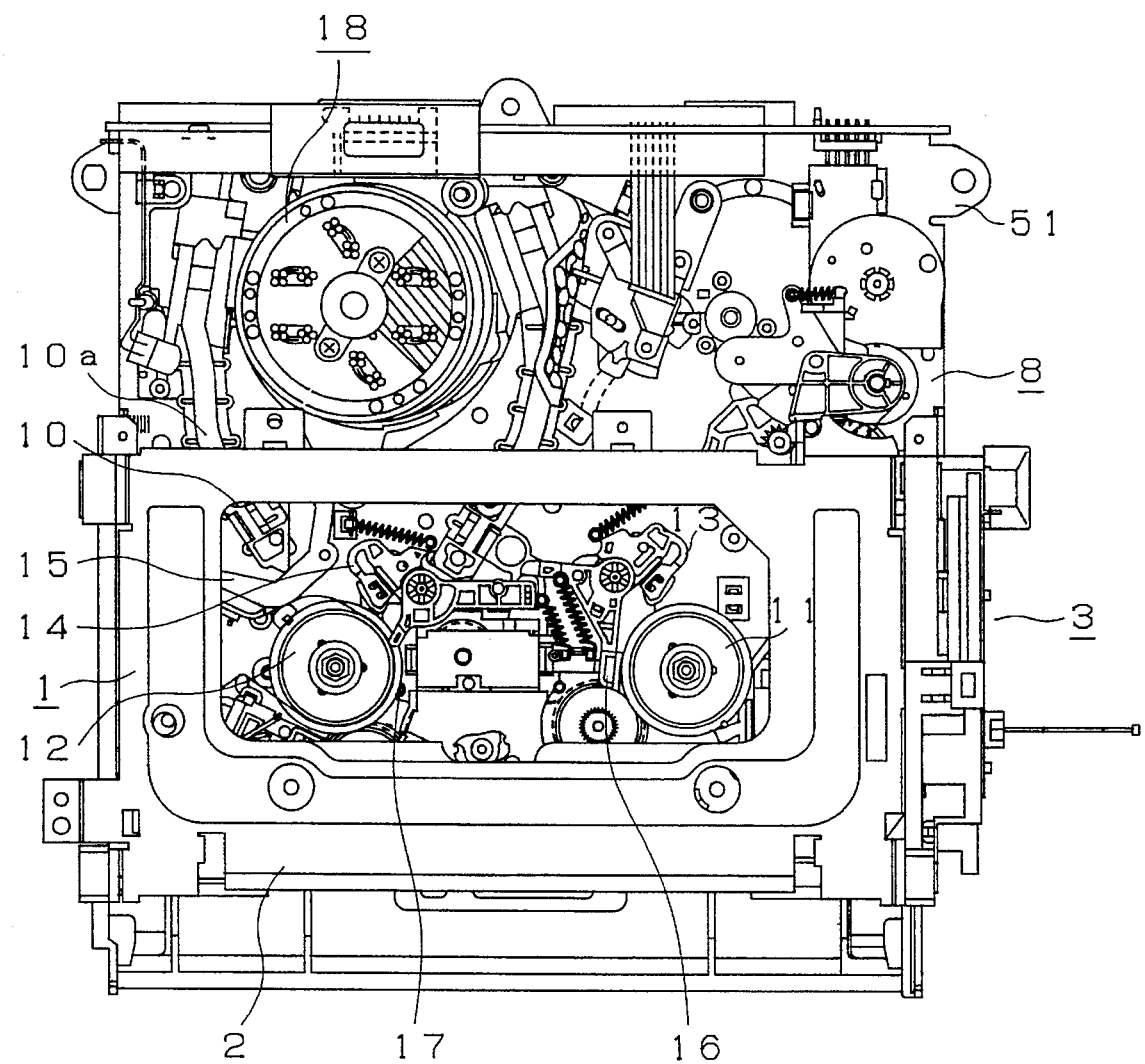
FIG. 3 is a schematic plan view of the major part of a magnetic recording/reproducing apparatus according to the present invention.

FIG. 3 is a schematic plan view of the major part of a magnetic recording/reproducing apparatus of the invention. A rotation drum unit 18 having a recording/reproducing head is provided at a predetermined position (an upper left portion in FIG. 3) of a main plate 51 in a substantially rectangular shape. On both of the sides of the rotation drum unit 18 are provided tape guide grooves 9a and 10a through which tape guides 9 and 10 for drawing a magnetic tape out of a cassette and winding it around the rotation drum are provided. A supply reel 12 and a take-up reel 11 are disposed on the lower side and the lower right side of the rotation drum unit 18, respectively. A movable front loading mechanism unit 1 is provided on the lower portion of the main plate 51 for loading a video cassette. Reference numeral 2 denotes a top prate of the front loading mechanism unit 1 which is driven by a front loading driving unit 3.

Figure 4:
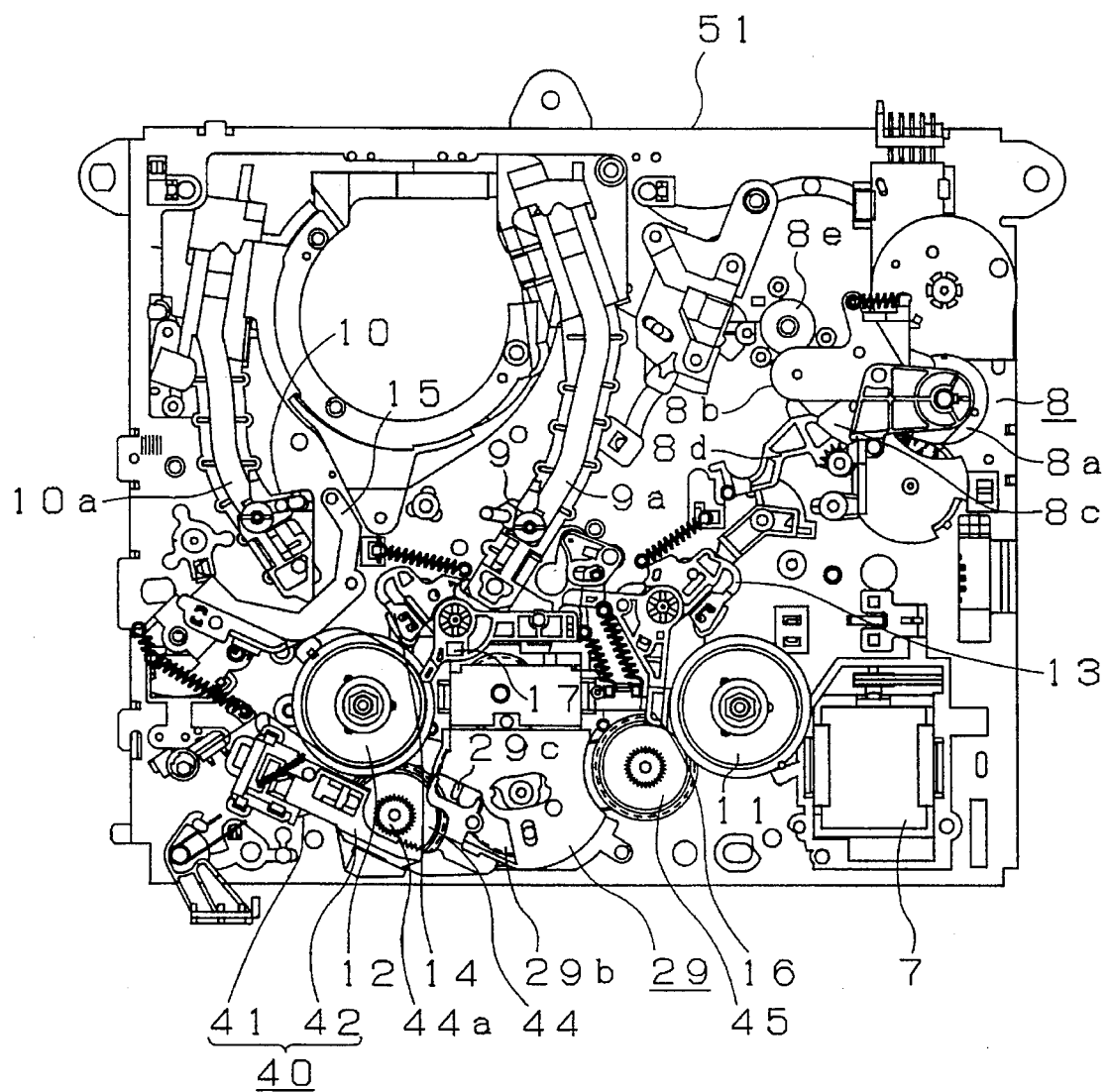
FIG. 4 is a schematic plan view of the magnetic recording/reproducing apparatus shown in FIG. 3 from which a rotation drum unit, a front loading mechanism unit and a front, loading driving unit are removed.
Figure 5:
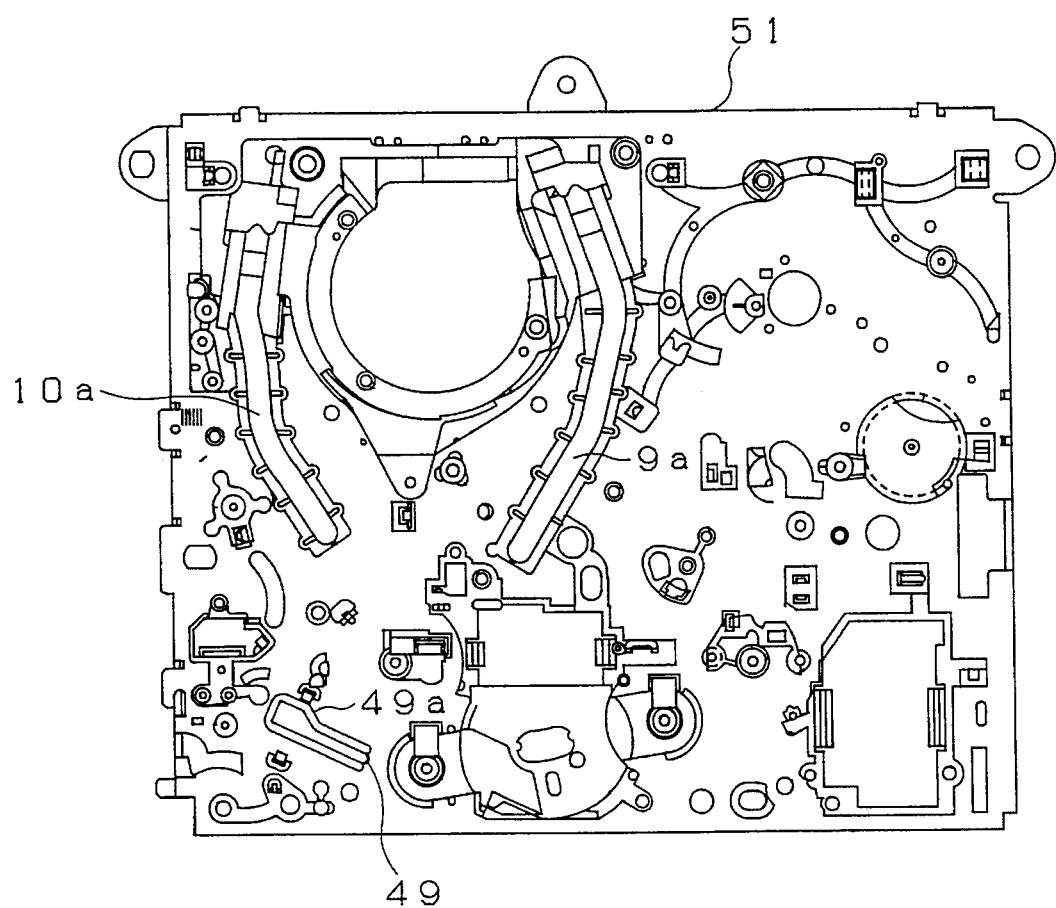
FIG. 5 is a plan view of a main plate of the magnetic recording/reproducing apparatus shown in FIG. 3 from which almost all the components are removed.
Figure 6A:
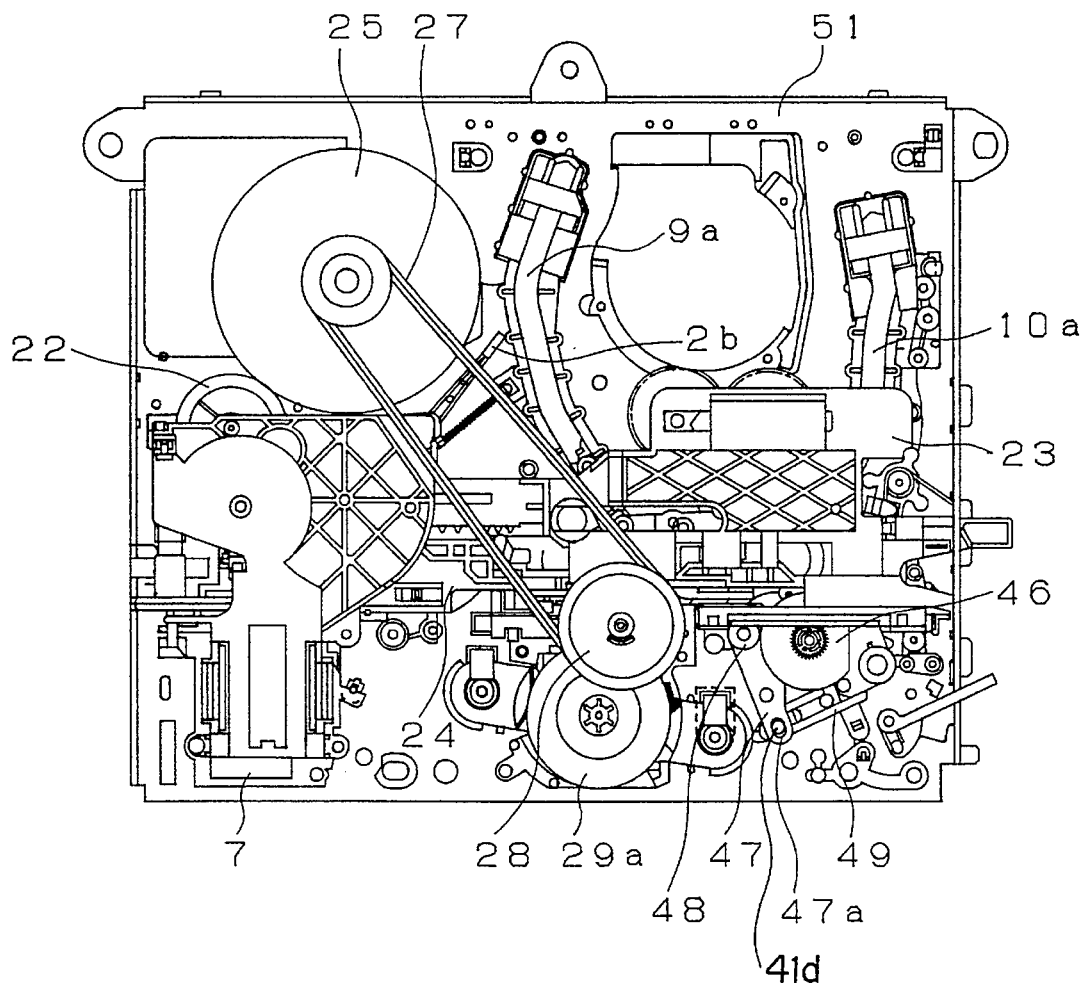
FIG. 6A is a rear view of the magnetic recording/reproducing apparatus of this invention.
Figure 7:
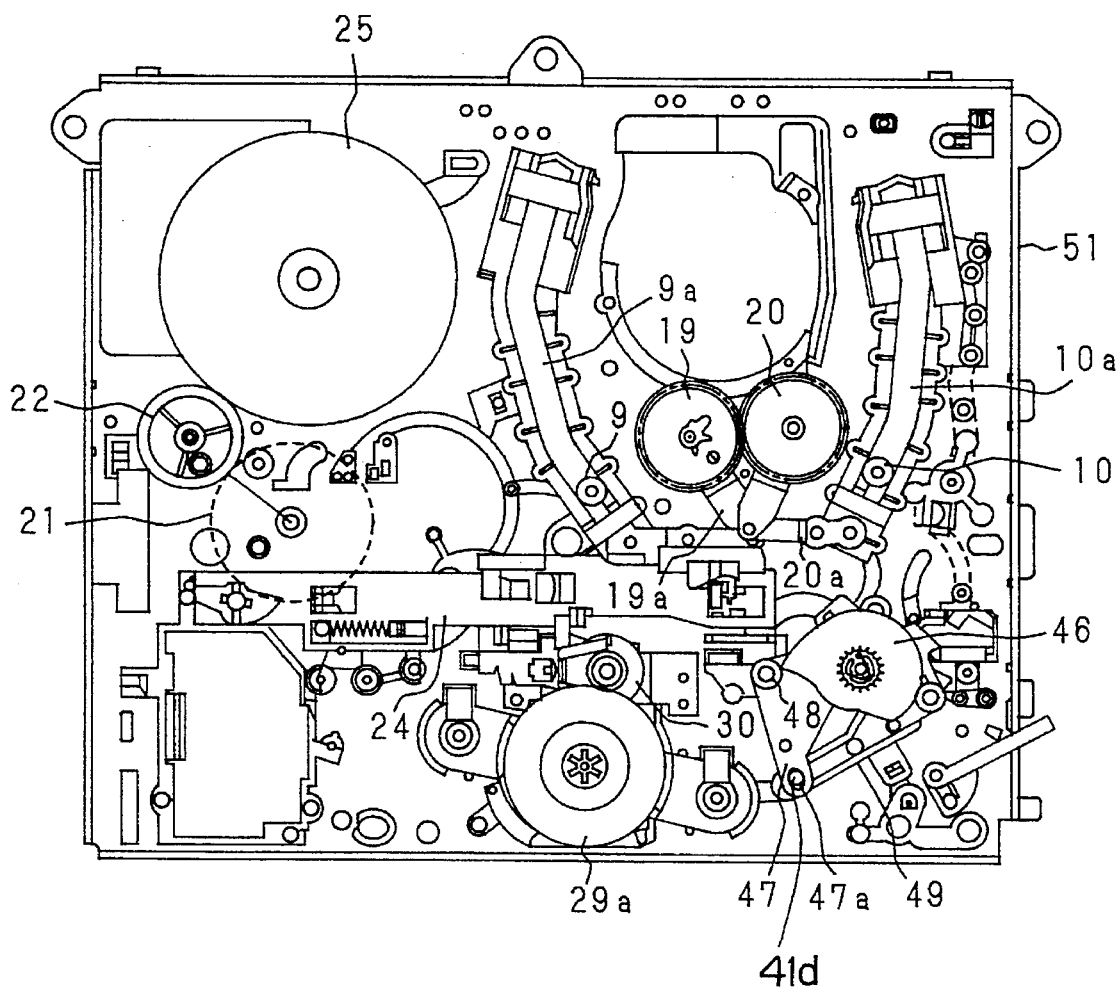
FIG. 7 is a rear view of the magnetic recording/reproducing device of FIG. 6A from which components such as a cam plate and a loading motor are removed.

FIG. 4 is a schematic plan view of the magnetic recording/reproducing apparatus of FIG. 3 from which the rotation drum unit 18, the front loading mechanism unit 1 and the front loading driving unit, 3 are removed. FIG. 5 is a plan view of the main plate 51 from which most of the components are further removed. FIG. 6A is a rear view of the magnetic recording/reproducing apparatus of the invention. FIG. 7 is a rear view of the apparatus from which components shown in FIG. 6A such as a cam plate and a loading motor are removed so as to allow other components thereunder to appear.

In FIG. 4, a loading motor 7 is provided at a lower right portion, and a pinch roller driving unit 8 is disposed on the upper side of the loading motor 7. The pinch roller driving unit 8 includes a cam pinch 8a, a pinch roller 8b, an arm gear 8c and an arm 8d. The axis of a capstan motor 25 works as a capstan axis 8e. A magnetic tape is sandwiched between the capstan axis 8e and the pinch roller 8b so as to be fed at a predetermined rate.

The take-up reel 11 and the supply reel 12 are braked by main brakes 13 and 14, respectively, and sub brakes 16 and 17 are provided thereto respectively. An arm-tension 15 for adjusting the tension of a magnetic tape is mounted on the side of the supply reel 12.

On the lower side of the supply reel 12 and the take-up reel 11 are disposed an idler gear unit 29 including a idler gear 29b, a hook 29c on the idler gear 29b and a idler gear 29a which is coaxial with the idler gear 29b and provided on the rear surface of the main plate 51. A pulling unit guide portion 49 is disposed at a lower left portion of the main plate 51 so as to be inclined with the left portion thereof slightly upward. A charge mechanism unit 40 includes a pulling unit 41 movable along the pulling unit guide 49 and a winding unit 42 for supply a rotation reel driving gear 44 for rewinding a loose magnetic tape.

Figure 6B:
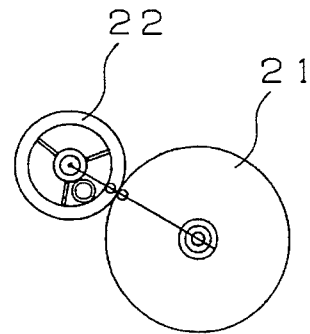
FIG. 6B is a diagram showing the engagement portion of a main gear with a joint gear concealed in FIG. 6A.
Figure 6C:
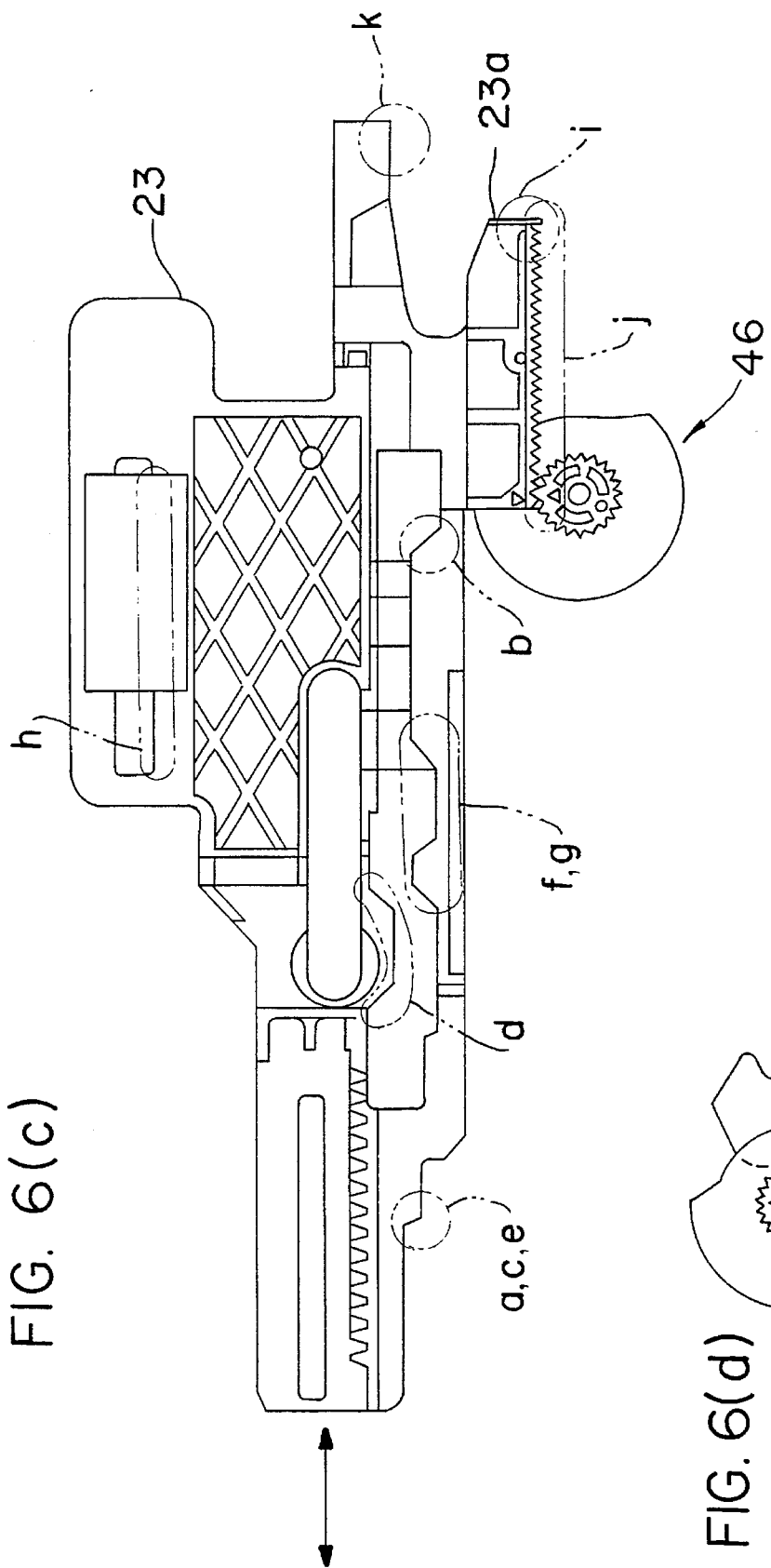
FIG. 6c is an enlargement of cam plate 23

In FIG. 5A, the capstan motor 25 is provided at an upper left portion. The power of the capstan motor 25 is transmitted to a capstan belt 27 and a pulley belt 28, and is received by the idler gear 29a engaging with a pulley gear coaxially rotating with the pulley belt 28. The capstan motor 25 is braked by a brake capstan 26. A main gear 21 and a joint gear 22 are provided on the lower left side of the capstan motor 25 for receiving the power of the loading motor 7. The main gear 21 is provided with a cam late 24 for actuating the brakes in the FF/REW mode. In FIG. 6(c), the cam plate 23 is linearly driven by power through the main gear 21. Cam plate 23 continues to move throughout the execution of the modes, during which movement the cam plate 23 distributes power to each section. Referring to the diagram of operational sequence in FIG. 15, the portions indicated by (b), (d), (f), (g), (h), (k), and (k) show that the cam plate 23 directly drives the appropriate components and the portions indicated by (a), (c), (e), and (j) show that the cam plate 23 indirectly drives the appropriate components through the levers.

In FIG. 7, arm load gears 19 and 20 and arm loads 19a and 20a for driving the tape guides 9 and 10, respectively are provided on the lower side of the mounting position of the rotation drum unit 18. The arm load gears 19 and 20 are provided with a cam plate 23 for braking these gears.

At the lower right portion of the rear face shown in FIGS. 6A and 7 are provided a cam gear 46 for driving the charge mechanism unit 40 and a lever 47 driven by the cam gear 46. One end of the lever 47 is fixed with a fulcrum 48. The other end of the lever 47 is provided with an opening 47a. A projection 41d described below penetrates the opening 47a and the pulling unit guide 49, thereby allowing the lever 47 to rotate witch the fulcrum 48 as the center. FIG. 6B shows engagement between the main gear 21 and the joint gear 22 concealed by the cover of the loading motor 7 in FIG. 6A.

Figure 8:
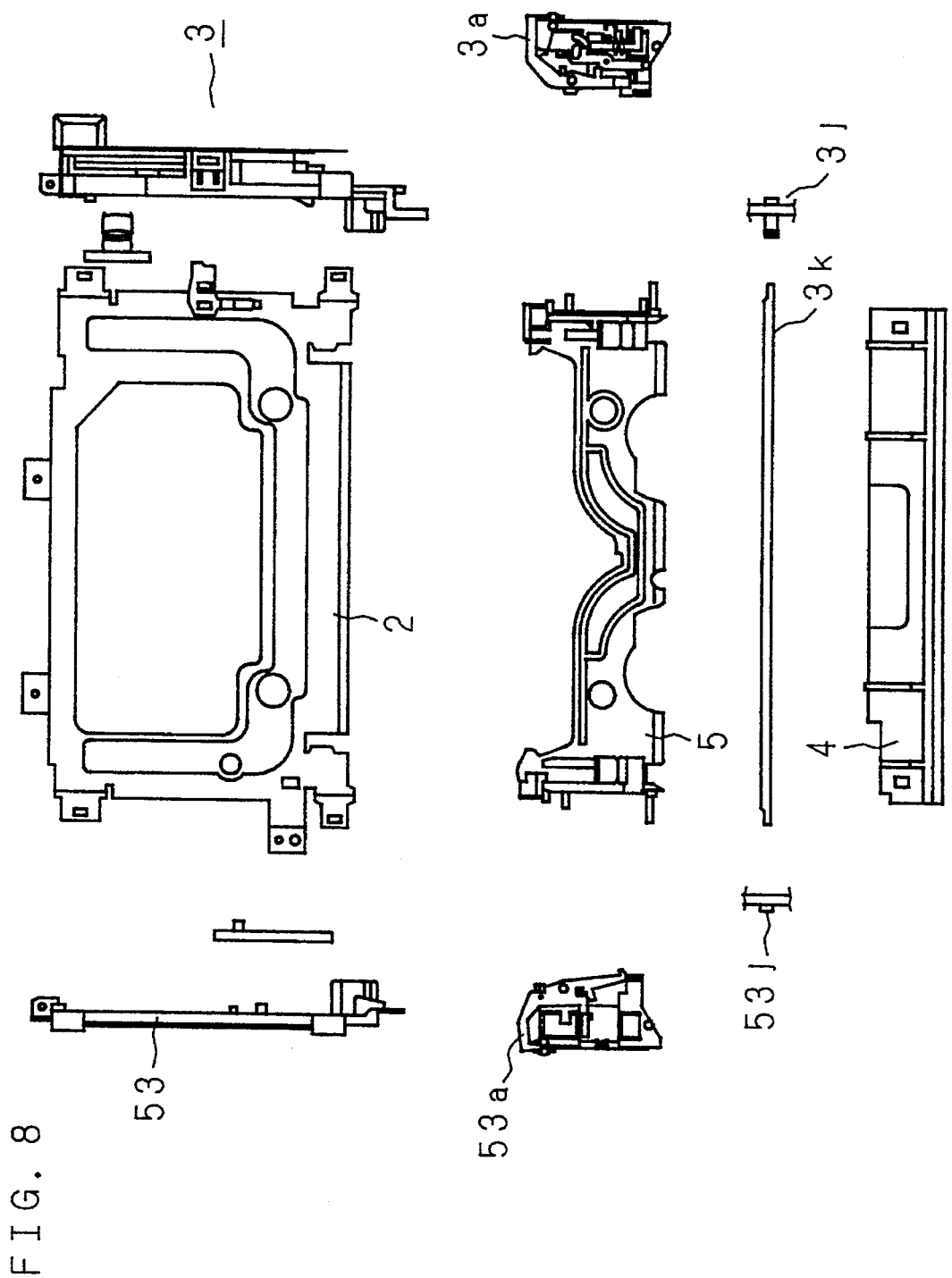
FIG. 8 is an exploded plan view of the front loading mechanism unit.
Figure 9:
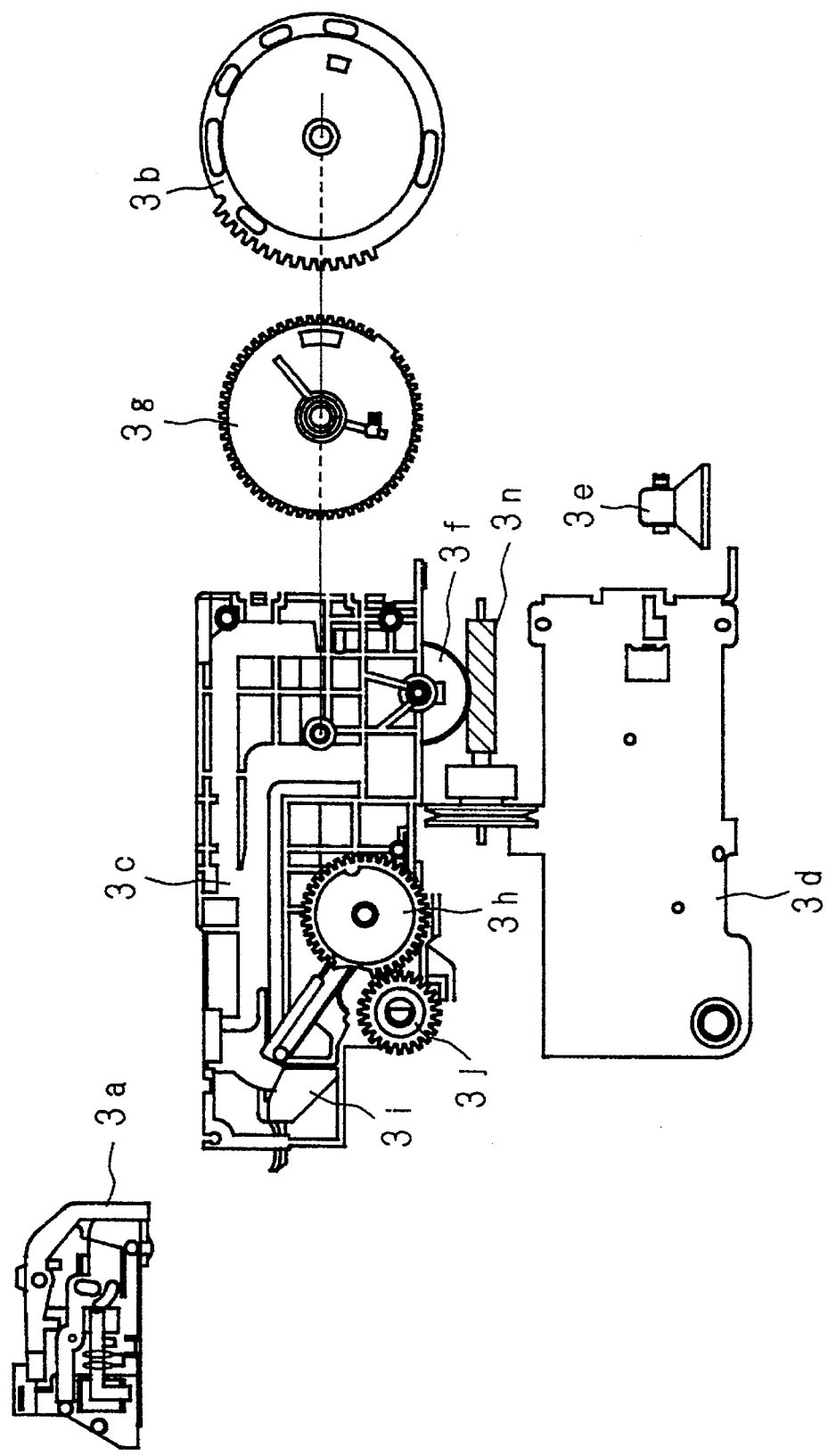
FIG. 9 is an exploded side view of the front loading driving unit.

FIG. 8 is an exploded plan view of the front loading mechanism unit 1, and FIG. 9 is an exploded side view of the front loading driving unit 3. A bottom plate 5 for conveying a cassette is disposed on the rear surface of the top plate 2 so as to be supported by stoppers 3a and 53a.

The front loading driving unit, 3 includes a side holder 3c having an L-shaped groove 3m, a gear 3g, a gear sense 3b disposed on the gear 3g with a spring therebetween, a gear drive 3f for transmitting the power from the loading motor 7, an arm gear 3h driven by engaging with the synchronous gear 3j, an arm door 3i for keeping open of the door of the tape insertion slit, a start/end (S/E) sensor unit 3e for detecting the movement of the bottom plate 5, and a presser plate 3d for holding each gear in the front loading driving unit 3. The side holder 3c is penetrated by a shaft 3k. Synchronous gears 3j and 53j are disposed on the respective ends of the shaft 3k.

Another side holder 53 also includes an arm gear and the stopper 53a. The power of the arm gear 3h is transmitted to this arm gear through the synchronous gears 3j and 53j, thereby synchronously driving the stoppers 3a and 53a. A cassette insertion slit plate 4 is provided at the cassette insertion slit of the magnetic recording/reproducing apparatus.

Figure 10A:
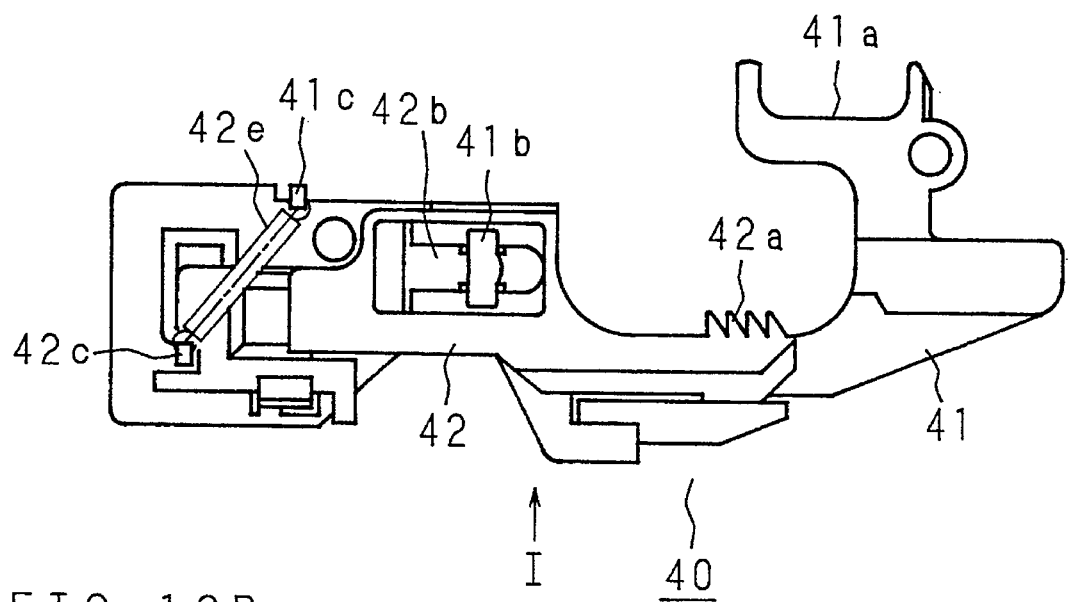
FIG. 10A is a plan view of a pulling unit and a winding unit.
Figure 10B:
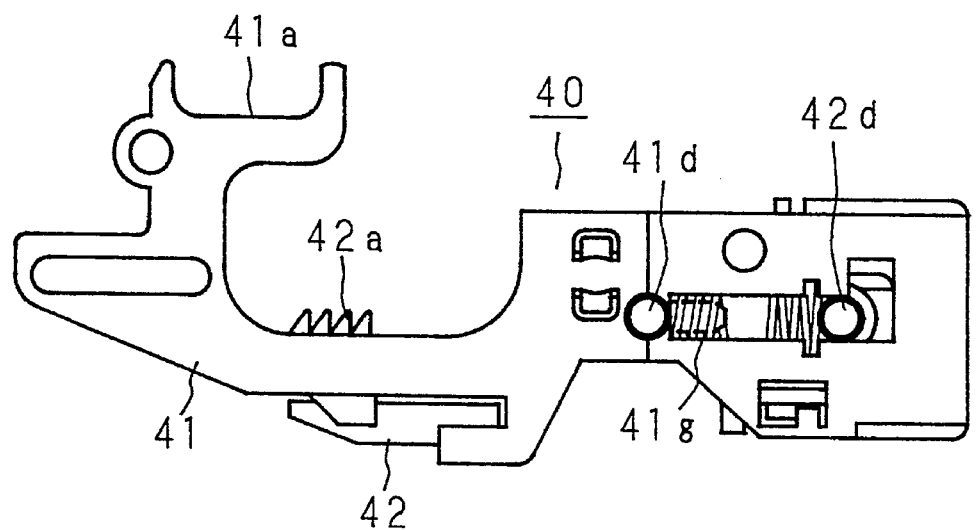
FIG. 10B is a rear view of the pulling unit and the winding unit.
Figure 10C:
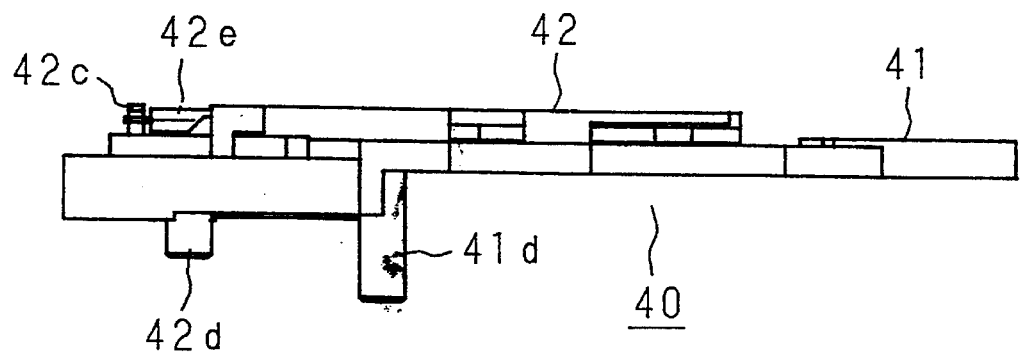
FIG. 10C is a side view of the pulling unit and tile winding unit taken from the direction of an arrow I in FIG. 10A.
Figure 12A:
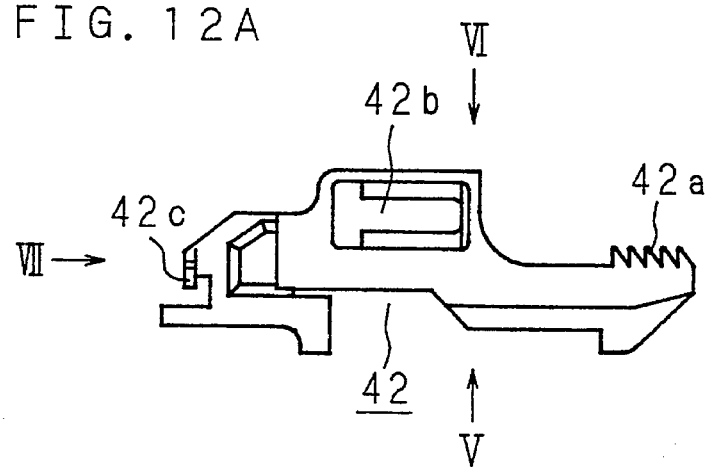
FIG. 12A is a plan view of the winding unit.
Figure 12E:
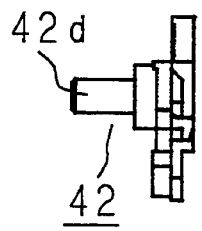
FIG. 12E is a side view of the winding unit taken from the direction of an arrow VII in FIG. 12A.
Figure 12B:
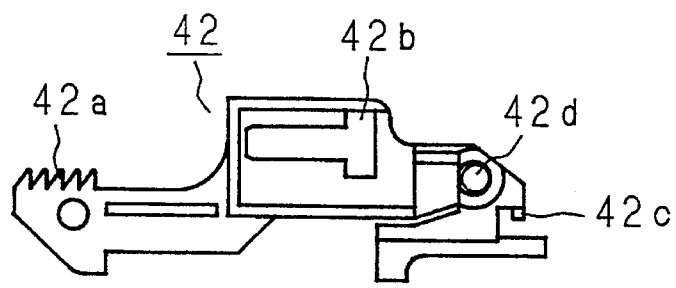
FIG. 12B is a rear view of the winding unit of FIG. 12A.
Figure 12C:
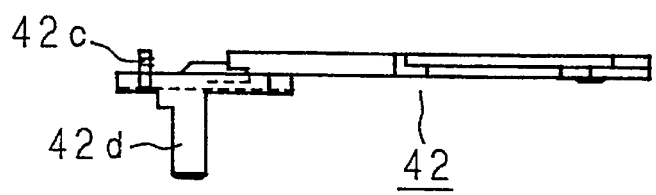
FIG. 12C is a side view of the winding unit taken from the direction of an arrow V in FIG. 12A.
Figure 12D:
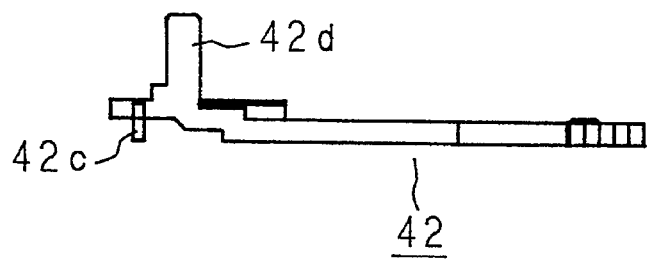
FIG. 12D is a side view of the winding unit taken from the direction of an arrow VI in FIG. 12A.

The charge mechanism unit 40 for preventing the tape from loosening will now be described in detail. FIGS. 10A through 10C are enlarged views of the pulling unit 41 and the winding unit 42 constituting the charge mechanism unit 40. FIG. 10A is a plan view thereof, FIG. 10B is a rear view thereof, and FIG. 10C is a side view thereof taken from the direction of an arrow I. FIGS. 11A through 11D are enlarged views of the pulling unit 41. FIG. 11A is a plan view thereof, FIG. 11B is a side view thereof taken from the direction of an arrow II, FIG. 11C is a side view thereof taken from the direction of an arrow III and FIG. 11D is a side view thereof taken from the direction of an arrow IV. FIGS. 12A through 12E are enlarged views of the winding unit 42. FIG. 12A is a plan view thereof, FIG. 12B is a rear view thereof, FIG. 12C is a side view thereof taken from the direction of an arrow V, FIG. 12D is a side view thereof taken from the direction of an arrow VI, and FIG. 12E is a side view thereof taken from the direction of an arrow VII.

The pulling unit, 41 includes a hook 41a for pulling the hook 29c of the idler gear unit, 29, a projection 41b for attaching the pulling unit 41 to the winding unit, 42, a claw 41c for fixing a spring 42e connecting the pulling unit 41 and the winding unit 42, the cylindrical projection 41d which is inserted in lever opening 47a and rides along pulling unit guide 49, a projection 41e for supporting a spring 41g elastically widening the interval between the projection 41d and a projection 42d of the winding unit 42, and an L-shaped groove 41f. The winding unit, 42 includes a rack 42a engaging with a gear 44a disposed on the inner circumference of the reel driving gear 44, a groove 42b for fitting the projection 41b of the pulling unit 41, a claw 42c for fixing the spring 42e, and the cylindrical projection 42d to be fit in the L-shaped groove 41f of the pulling unit 41.

The cylindrical projection 42d of the winding unit 42 fits in the groove 41f of the pulling unit 41, and the projection 41b of the pulling unit 41 is movably fit in the groove 42b of the winding unit 42. The cylindrical projection 42d of the winding unit, 42 is movably fit in the L-shaped groove 41f of the pulling unit 41 through the spring 41g with tension. The projection 41e in the groove 41f is inserted into the spring 41g so as to support the spring 41g. A spring 42e is fixed between the claw 42c at one end of the winding unit 42 and the claw 41c of the pulling unit 41. In this manner, the respective projections of the winding unit 42 and the pulling unit 41 are fit in the respective grooves, thereby attaching the winding unit 42 slidably to the pulling unit 41 through the spring 41g in the L-shaped groove 41f.

The pulling unit 41 pulls the gear idler unit 29 away from the take-up reel 11 toward the supply reel 12 side when the operational direction of the magnetic recording/reproducing apparatus changes from forward to reverse. The winding unit 42 engages the supply reel driving gear 44 thereby rotating the supply reel driving gear 44 and the supply reel 12 so as to rewind the loose tape.

Figure 13:
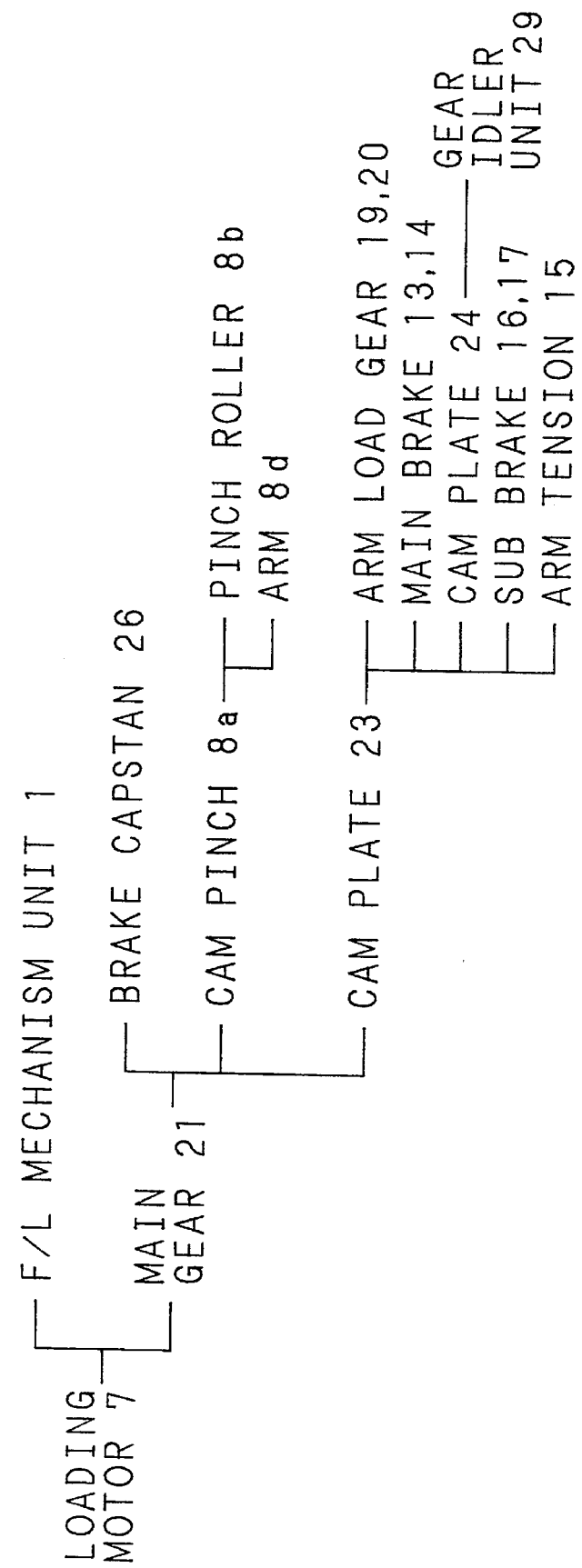
FIG. 13 is an explanatory view of a loading motor driving system.

FIG. 13 is an explanatory view of the loading motor driving system of the present apparatus. The power of the loading motor 7 is transmitted to the front loading mechanism unit 1 and the main gear 21 through worm gear 3n. The power of the main gear 21 driven by the power of the loading motor 7 is transmitted to the brake capstan 26, the cam pinch 8a and the cam plate 23. The power of the cam plate 23 driven in this manner is transmitted to the arm load gears 19 and 20, the main brakes 13 and 14, the cam plate 24, the sub brakes 16 and 17, and the arm tension 15. The power of the cam plate 24 driven in this manner is transmitted to the idler gear unit 29.

FIG. 14 illustrates the capstan mot-or driving system of the apparatus. The power of the capstan motor 25 is transmitted to a capstan belt 27, the pulley belt 28, a pulley gear 30, the idler gear unit 29 and the cam gear 46 in this order.

Figure 15:
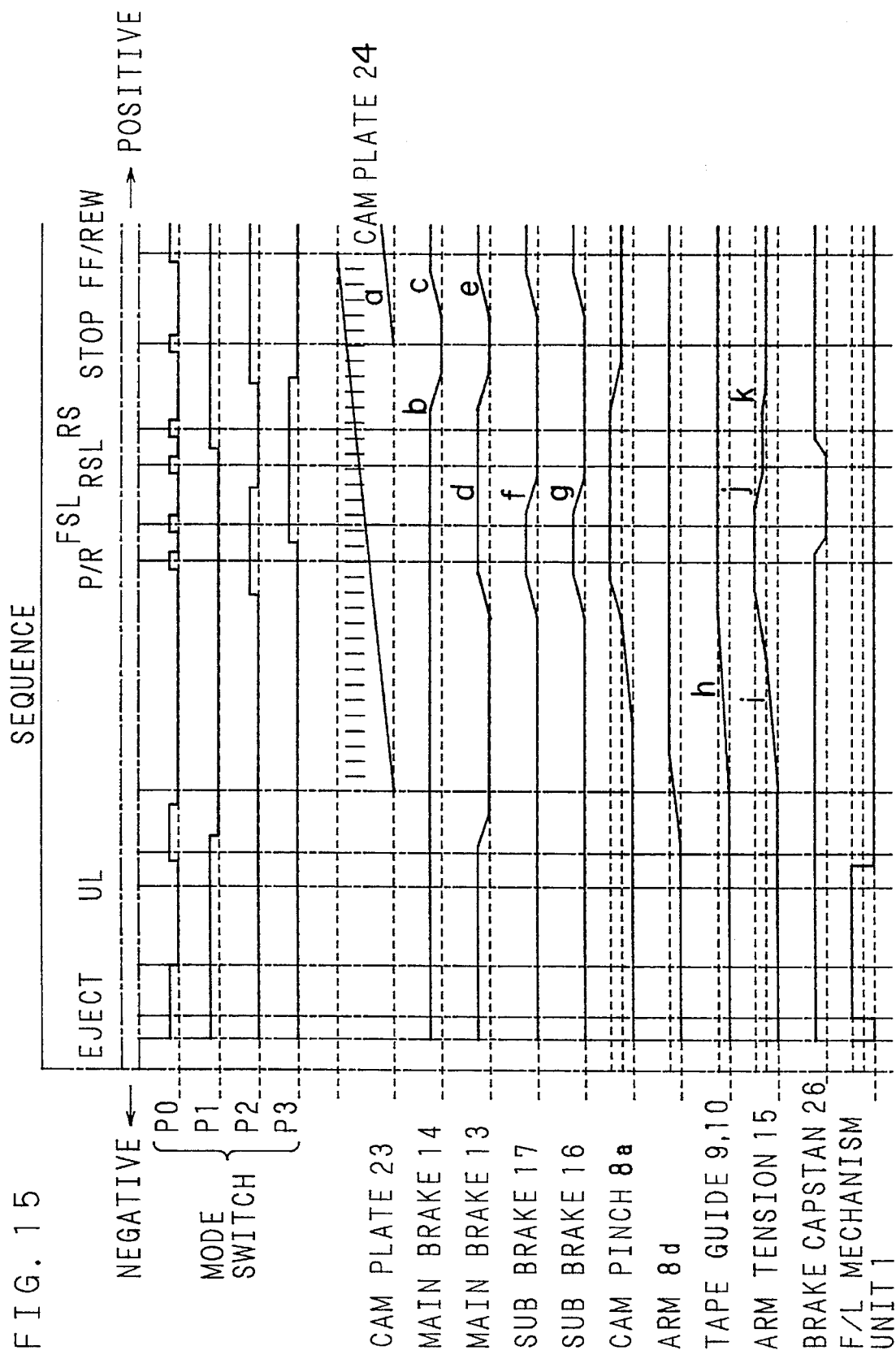
FIG. 15 illustrates an example of sequence ill tile present apparatus.

The operation of the apparatus of the invention having the above-mentioned structure, showing an exemplified sequence in FIG. 15, will now be described.

[The operation of the front loading mechanism unit 1]

At first, the operation of the front loading (F/L) mechanism unit 1 for loading a cassette in the magnetic recording/reproducing apparatus will be described. When a cassette is inserted through the tape insertion slit of the magnetic recording/reproducing apparatus, the cassette pushes aside the cassette insertion slit plate 4 and goes into the device. The inserted cassette pushes the door integrated with the front panel of the apparatus, thereby entering the magnetic recording/reproducing device. When the cassette is further pushed, the stopper 3a is pushed. The stopper 3a rotatably fixed to the side holders 3c and 53 on the side surfaces of the bottom plate 5 is rotated, thereby unlocking the top plate 2. When the cassette is still Further pushed, the bottom plate 5 bearing the cassette starts moving, and the gear sense 3b is rotated in accordance with the movement, thereby shading the optical path of the S/E sensor adjacent to the side holder 3c. As a result, a microcomputer instructs the loading motor 7 to rotate. The rotation of the loading motor 7 is transmitted to a worm gear 3n, thereby actuating the gear drive 3f. The rotation of the gear drive 3f rotates the arm gear 3h. The cam of the arm gear 3h elevates the arm door 3i to raise the door and keep it open. The arm gear 3h further rotates, and the cam of the arm gear 3h moves the arm door 3i, thereby releasing the kept door to be closed. The rotation of the arm gear 3h rotates the synchronous gear 3j fixed on the shaft 3k, and through the shaft 3k the other arm gear is synchronously rotated, thereby moving the bottom plate 5 bearing the cassette. The bottom plate 5 horizontally moves by a predetermined extent along the L-shaped groove 3m on the inner surface of the side holder 3c. Then, the bottom plate 5 vertically moves downward to be set in the magnetic recording/reproducing device.

The cassette is set in the magnetic recording/reproducing apparatus in this manner, and then tape loading is performed. The power from the loading motor 7 is transmitted to each component, as is shown in FIG. 13, thereby loading or unloading the magnetic tape set in the magnetic recording/reproducing apparatus.

[Driving of the loading motor 7]

As is shown in FIG. 13, the rotation of the loading motor 7 is transmitted to the cam pinch 8a through the main gear 21. When a magnetic tape is loaded, the cam pinch 8a moves the arm gear 8c and the arm 8d, thereby drawing the magnetic tape out of the cassette. After drawing the magnetic tape, the pinch roller 8b is lowered, thereby pressing the pinch roller 8b against the capstan axis 8e. When a magnetic tape is loaded or unloaded, the pinch roller 8b is raised or lowered by rotating the cam pinch 8a.

[Loading operation]

The rotation transmitted from the loading motor 7 to the main gear 21 is further transmitted to the pinch roller driving unit 8 and the cam plate 23. The main gear 21 includes gears on the outer circumference and the innermost circumference, and two grooves are formed between these gears. The brake capstan 26 is moved by one of the grooves formed on the main gear 21, thereby braking the capstan motor 25. The main brake 13 is moved by the other groove.

When the cam plate 23 is moved, the main brake 13 on the side of the take-up reel 11 is closed to brake the take-up reel 11. The rotation of the cam pinch 8a moves the arm gear 8c and the arm 8d, thereby drawing out the magnetic tape. The rack formed on the cam plate 23 is engaged with a plurality of gears on the arm load gear 19 respectively having different pitch diameters, thereby transmitting the movement of the cam plate 23 to the arm load gear 19. As a result, the arm load gear 19 is rotated, thereby transmitting the rotation to the arm load gear 20. The arm load gears 19 and 20 are connected to the arm loads 19a and 20a moving in accordance with the movement of the gears, respectively. On the other ends of the arm loads 19a and 20a are fixed the tape guides 9 and 10, respectively. By the rotation of the arm load gears 19 and 20, the tape guides 9 and 10 fixed on the arm loads 19a and 20a are moved along the tape guide grooves 9a and 10a, respectively, thereby drawing the magnetic tape out of the cassette and winding it around the rotation drum unit 18.

When the magnetic tape is finished winding around the rotation drum unit 18 by the tape guides 9 and 10, the cam plate 23 further moves to release the main brake 13 on the side of the take-up reel 11. At certain time during the tape loading, the pinch roller 8b starts lowering. When the pinch roller 8b finishes lowering, the pinch roller 8b is pressed against the capstan axis 8e to sandwich the magnetic tape therebetween. The cam plate 23 further moves to attain a back tension brake by the arm tension 15. Just before the reproducing/recording (P/R) operation, the sub brakes 16 and 17 are turned off to release the brake. Then, the tape tension is increased to hold the magnetic tape tightly around the rotation drum unit 18. As a result of the above-mentioned procedure, the magnetic recording/reproducing apparatus of the invention is brought to the state for reproducing or recording. The above-mentioned procedure is illustrated between EJECT and P/R in FIG. 15.

[Loading operation between respective operational positions]

1. From P/R to FSL (forward slow):

The brake capstan 26 is moved by the rotation of the main gear 21, thereby braking the capstan motor 25. The feeding rate of the magnetic tape is lowered, and slow reproduction is conducted.

2. From FSL to RSL (reverse slow)

The rotation of the pulley gear 30 swings the idler gear unit 29 toward the supply reel 12. Referring to FIG. 6(c), the movement of the cam plate 23 causes the rack portion 23a to rotate the cam gear 46. The cam gear 46 has a cam face in the periphery whereby the spring force upon the arm tension 15 is weakened through a spring hook 49a integral with the guide 49 and the lever 47.

Figure 6D:
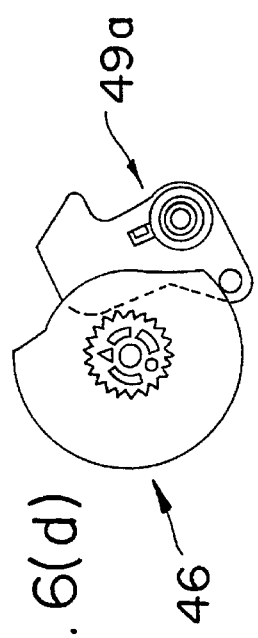
FIG. 6(d) is an enlargement of the cam gear 46.

FIG. 6(d) is an enlargement which more clearly shows the arrangement of the spring hook 49a of the pulling unit guide 49 and the cam gear 46.

3. From RSL to RS (reverse search):

The brake capstan 26 is moved by a cam groove of the main gear 21, thereby releasing the mechanical brake for the capstan motor 25. The rate of the capstan motor 25 is increased, and reverse high speed reproduction is conducted.

4. From RS to STOP

The cam plate 23 is moved, the charge mechanism unit 40 starts moving toward the take-up reel 11, and the sub brake works. The pressure by the pinch roller 8b is released, and the cam plate 23 makes the main brake work.

5. From STOP to FF/REW

The cam plates 23 and 24 move together to release the main brakes and the sub brakes. The pulley gear 30 changes its position, thereby transmitting the power of the capstan motor 25 directly to the supply reel 12 and the take-up reel 11, not through the slip mechanism in the idler gear unit 29. Thus, a big torque is transmitted.

[Mechanism for preventing the tape tension from lowering]

A mechanism for preventing the tape tension from lowering according to the present invention prevents a magnetic tape from loosening when the operational direction of the apparatus changes from forward to reverse. The mechanism (i.e., the charge mechanism unit 40) will now be described in detail. FIGS. 16 through 20 are enlarged views showing the operational states of the charge mechanism 40 at the respective mechanical positions.

[Regarding the charge mechanism unit 40]

For example, when the apparatus changes the operation from the forward slow to the reverse slow, the capstan motor 25 is rotated in the reverse direction, thereby swinging the hook 29c of the idler gear unit 29 from the take-up reel driving gear 45 to the supply reel driving gear 44. Thus, the supply reel driving gear 44 is rotated. During the swing of the hook 29c, the power from the capstan motor 25 is not transmitted to the supply reel driving gear 44. The capstan motor 25, however, is still rotating, and therefore, the magnetic tape tightly sandwiched between the capstan axis 8e and the pinch roller 8b continues to be fed out. Therefore, the fed-out magnetic tape loosens, not being rewound around the supply reel 12. In order to prevent this, using not only the power from the capstan motor 25 but also the charge mechanism unit 40, the gear idler unit 29 is rapidly swung and the loose tape is rewound.

The idler gear unit 29 is swung as follows: When the capstan motor 25 is rotated in the reverse direction, the pulley belt 28 is also rotated in the reverse direction. The pulley gear 30 coaxially rotates with the pulley belt 28 and engages the idler gear 29a, thereby swinging the idler gear unit 29. The idler gear 29b is connected to the idler gear unit 29 by a connecting member (integrated with the hook 29c) provided on tile rotation axis of the pulley gear 30 (in the vicinity of the surface of the main plate 51), and is swung with the axis as the fulcrum.

Figure 16:
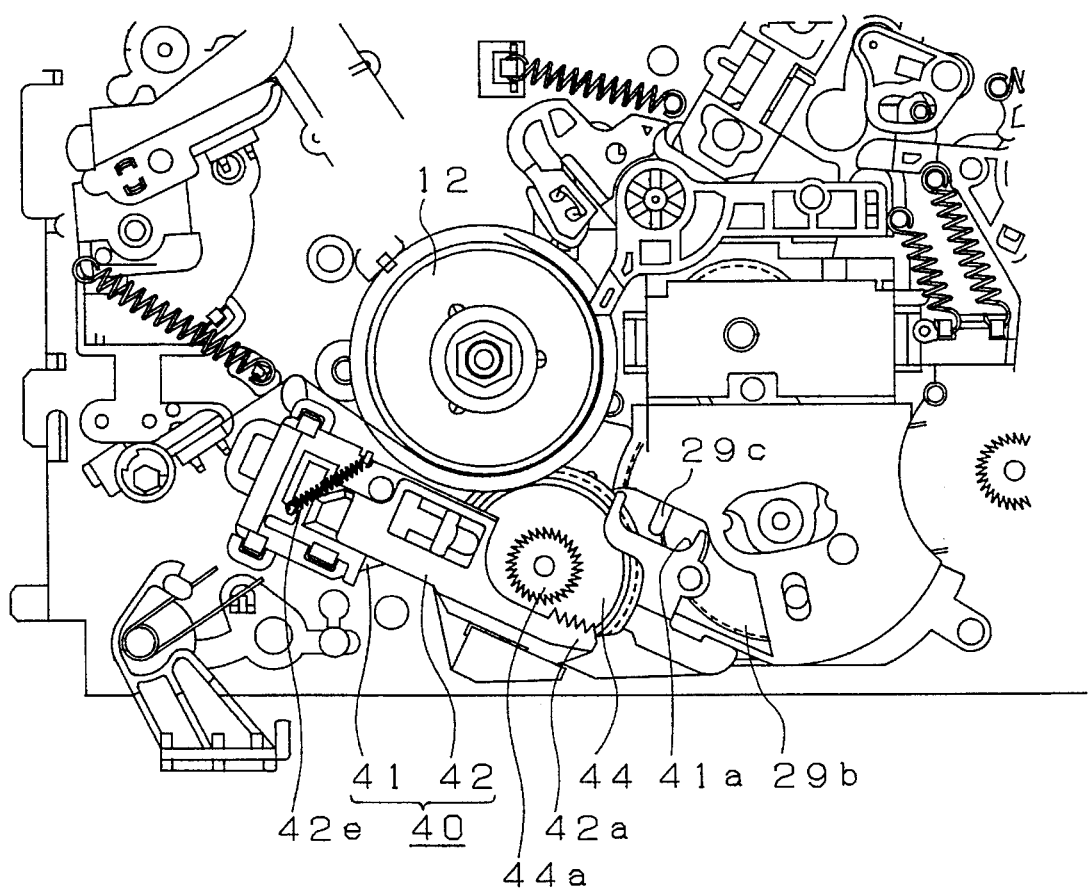
FIG. 16 is an enlarged view showing an operational state of a charge mechanism unit in one mechanical position.
Figure 17:
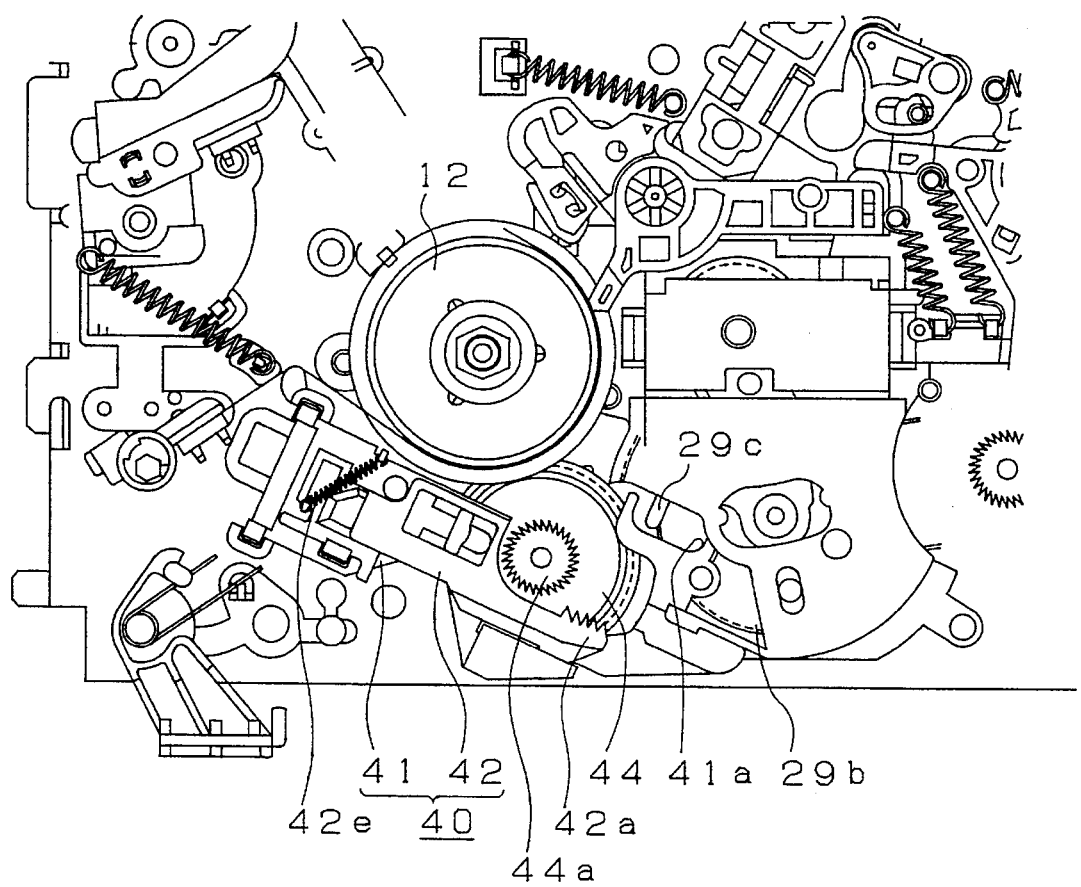
FIG. 17 is an enlarged view showing an operational state of the charge mechanism unit in another mechanical position.

When the mechanical position (i.e., tile operation mode of the magnetic recording/reproducing apparatus) is EJECT, the charge mechanism unit 40 is at the position as shown in FIG. 16. When the mechanical position is P/R or FSL, the idler gear unit 29 moves toward the take-up reel 11 side as is shown in FIG. 17.

Figure 18:
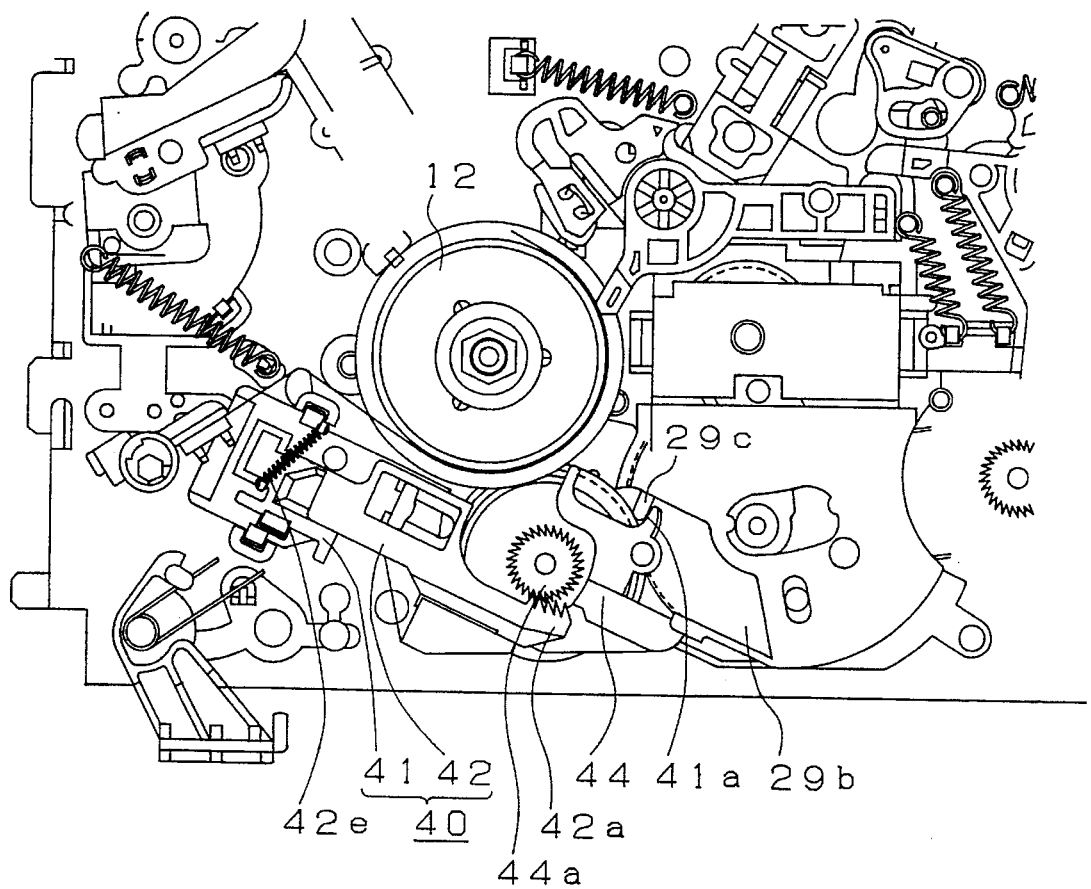
FIG. 18 is an enlarged view showing an operational state of the charge mechanism unit:, ill still another mechanical position.

When the mechanical position changes from FSL to RSL, namely, when the rotation direction of the magnetic tape changes from forward to reverse, the cam plate 23 moves in the charge mechanism unit 40 of the magnetic recording/reproducing apparatus, thereby rotating the cam gear 46 and moving the lever 47 which engages the groove of the cam gear 46 using the fulcrum 48 to follow the shape of the cam gear. Since one end of the lever 47 (i.e., the opening 47a) is fixed to the projection 41d of the charge mechanism 40, the pulling unit 41 of the charge mechanism 40 is moved away from the take-up reel side 11 toward the supply reel 12 side in accordance with the movement of the lever 47. During this movement, as is shown in FIG. 18, the hook 29c on the idler gear 29b is pulled by the pulling unit 41 of the charge mechanism unit 40, thereby pulling the hook 29c toward the supply reel 12 side.

Further, the winding unit 42 of the charge mechanism unit 40 is engaged with the gear 44a on the inner circumference of the supply reel driving gear 44. However, since the supply reel 12 cannot be rotated unless the tape tension is lowered, the rack 42a keeps on engaging the gear 44a. The pulling unit 41, however, is slide, and therefore, the spring 41g between the winding unit 42 and the pulling unit 41 is shrunk to charge an elastic force. FIG. 18 shows unit 41 is compressed to store elastic energy in spring 41g. FIG. 18 shows the state in which the spring energy of spring 41g is stored. When the arm tension 15 is released, the tape tension is lowered. When the stored spring force becomes larger than the tape tension, the winding unit 42 moves in order to rotate the supply reel 12 and thereby rewind the loose tape. Further, by moving the charge mechanism unit 40 toward the supplying reel 12 side (in the leftward direction in FIGS. 16 through 20), the spring force is charged again, by which the magnetic tape is rewound. This procedure is repeated several times, and is performed while the charge mechanism unit 40 is moving away from the take-up reel 11 side (i.e., from the right) toward the supply reel 12 side (i.e., to the left) little by little. Simultaneously, the idler gear 29b is pulled by the pulling unit 41 to position where it engages the supply reel driving gear 44.

Further, the cam plate 23 is moved, and the charge mechanism unit 40 having moved toward the supply reel 12 side starts returning toward the take-up reel 11 side when the mechanical position changes from Reverse Search (RS) to STOP. When the charge mechanism unit 40 returns towards the take-up reel 11, the rack 42a of the winding unit 42 engages the gear 44a and the supply reel driving gear 44 is thereby rotated in the feeding direction of the magnetic tape. As a result, the magnetic tape loosens. Therefore, the charge mechanism unit 40 is prevented from moving with the rack 42a engaging with the gear 44a as follows: When the power of the capstan motor 25 is transmitted to the supply reel driving gear 44 by the idler gear 29b, the rack 42a is kicked up by the rotation of the supply reel driving gear 44. As a result, the projection 42d of the winding unit 42 falls into the L-shaped groove 41f, thereby elevating the winding unit 42. Thus, the engagement between the rack 42a and the gear 44a is released, thereby moving the charge mechanism unit 40 without affecting the supply reel driving gear 44.

Figure 20:
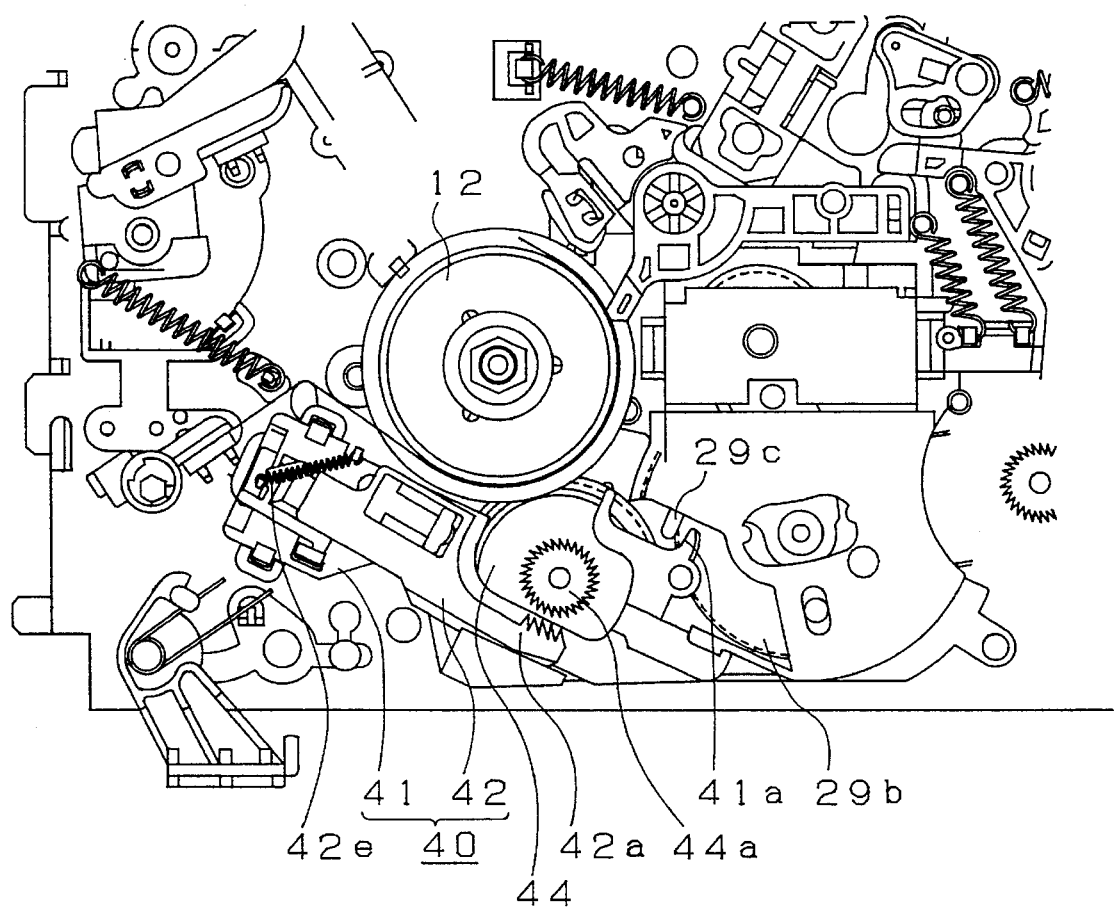
FIG. 20 is an enlarged view showing an operational state of the charge mechanism unlit in still another mechanical position.

Then, the winding unit 42 is lowered (as is shown in FIG. 16) approximately when it passes above the gear 44a on lube inner circumference of the supply reel driving gear 44 (FIG. 20). The elevated winding unit 42 is lowered when the cylindrical projection 42d of the winding unit 42 comes in contact with an inclined portion 49a of the guide 49 on the main plate 51 during the movement of the charge mechanism unit 40. In other words, during the movement of the charge mechanism unit 40, the cylindrical projection 42d in the L-shaped groove 41f moves, while keeping a contact with the inclined part 49a, being pulled by the spring 42e. Therefore, the projection 42d of the winding unit 42 reaches a plane port;ion of the groove 41f, resulting in lowering the elevated winding unit 42. The charge mechanism unit, 40 stops at a position (shown in FIG. 16) a little closer to the supply reel 12 side (i.e., slightly left) than the position thereof when the mechanical position is P/R.

Next, when the mechanical position changes from STOP to RS, the charge mechanism unit 40 starts moving again toward the supply reel 12 side as is shown in FIGS. 16 and 18. Also at this time, the charge mechanism unit 40 moves in the same manner as in case of changing of the mechanical position from FSL to RSL as described above, and the idler gear unit 29 is pulled toward the supply reel 12 side.

Figure 19:
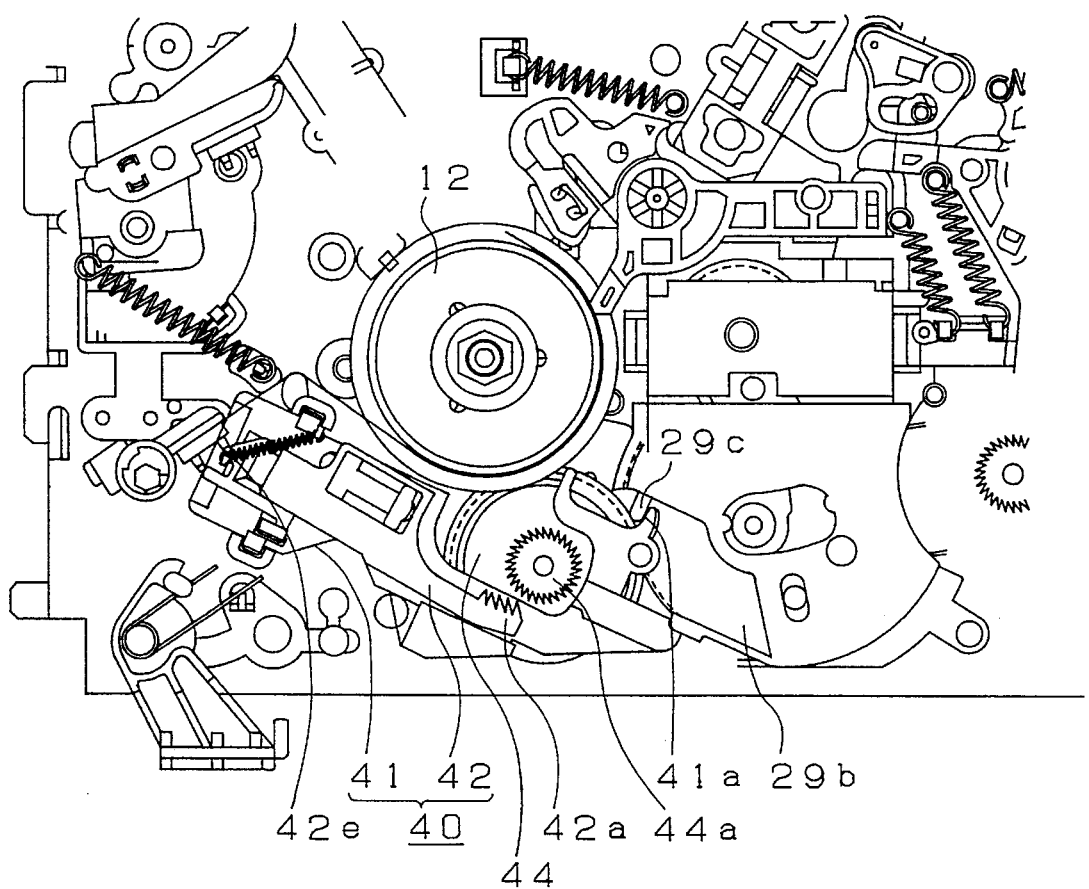
FIG. 19 is an enlarged view showing an operational state of the charge mechanism unit in still another mechanical position.

When the mechanical position changes from RS to RSL, the charge mechanism unit 40 stays at a position on the side of the supply reel 12 as is shown in FIG. 19.

When the mechanical position changes from RSL to FSL, the charge mechanism unit 40 on the side of the supply reel 12 side as shown in FIGS. 19, 20 and 16, returns toward the take-up reel 11 side. Also at this time, the charge mechanism unit 40 moves in the same manner as in case of changing the mechanical position from RS to STOP.

In the above described movement, the charge mechanism unit 40 stops at the following three positions: When the mechanical position is EJECT, the charge mechanism unit 40 stops at a position shown in FIG. 16. When the mechanical position is P/R or FSL, the charge mechanism unit 40 starts moving toward the take-up reel 11 side and stops at a position shown in FIG. 17. In case of RSL, the charge mechanism unit 40 starts moving toward the supply reel 12 side to reach a position shown in FIG. 19. In case of RS, the charge mechanism unit 40 stays at a position shown in FIG. 19. When the mechanical position changes from RS to STOP, the charge mechanism unit, 40 starts moving again toward the take-up reel 11 side and stops at the same position as that of EJECT (as shown in FIG. 16).

The charge mechanism unit 40 moves as described above. In the present invention, the pulling unit 41 augments the swing of the idler gear unit 29 and is integrated with the winding unit 42 for rewinding the loose tape. Therefore, less space is required for the inventive components. Further, the driving power can be easily directed.

By using the charge mechanism unit 40, the swing rate of the idler gear unit 29 can be increased and the magnetic tape can be prevented from loosening. Therefore, a noiseless image can be provided even when the operational direction is changed from forward to reverse. In addition, forward reproduction can be smoothly changed to reverse reproduction. The above-mentioned reproducing operation includes both slow and high speed reproducing operations.

As this invention may be embodied in several forms without departing from the spirit of essential characteristics thereof, the present embodiment is therefore illustrative and not restrictive, since the scope of the invention is defined by the appended claims Father than by the description preceding them, and all changes that fall within metes and bounds of the claims, or equivalence of such metes and bounds thereof are therefore intended to be embraced by the claims.

What is claimed is:

1. A tape recording/reproducing apparatus having tape reels each of which are rotatable in both a forward and a reverse direction, comprising:

an idler gear adapted to switch between said tape reels and transmit rotation power to one of said tape reels;

a pulling unit for pulling said idler gear toward one of said tape reels; and a spring driven winding unit for winding the tape by rotating one of said tape reels using stored elastic energy in a spring.

2. A tape recording/reproducing apparatus having tape reels each of which are rotatable in both a forward and a reverse direction, comprising:

a main plate on which said tape reels are mounted;

an idler gear adapted to switch between said tape reels and transmit rotation to one of said tape reels;

a spring actuated winding unit for winding tape by rotating one of said tape reels;

a plate member for holding said winding unit in a slidable engagement;

a first guide provided on said main plate for guiding said plate member;

a cam-follower for sliding said plate member along said guide;

means for transmitting power to said cam-follower;

a second guide provided on said plate member for guiding said winding unit;

a first spring provided between said plate member and said winding unit for storing elastic energy when said plate member moves in relation to said winding unit and for moving said winding unit by using the stored elastic energy; and a second spring connecting said plate member to said winding unit.

3. A recording/reproducing apparatus according to claim 2, wherein said plate member includes a hook for pulling said idler gear toward one of said tape reels.

4. A tape tension device disposed within a tape recording/reproducing apparatus having tape reels for supplying and receiving tape, comprising:

a winding unit wherein said winding unit winds tape by driving one of the tape reels using stored elastic energy;

a pulling unit engaging an idler gear unit wherein said idler gear unit drives one of the tape reels at a time and is capable of switching between the tape reels;

a spring connected to said winding unit and said pulling unit storing elastic energy;

a cam;

a lever connected to said pulling unit following said cam as said cam rotates;

wherein when said tape reels change operational direction, said rotatable cam rotates thereby causing corresponding motion of said lever which causes said pulling unit to pull the idler gear to switch the idler gear between the tape reels; and wherein said winding unit releases the stored elastic energy in said spring to wind the tape when the tape reels change operational direction.

5. The device of claim 4 wherein said pulling unit includes a pulling unit hook engaging the idler gear unit.

6. The device of claim 4 wherein said idler gear unit includes a idler gear hook engaging said pulling unit.

7. The device of claim 4 further comprising a tape reel driving gear which transmits rotational power from said winding unit to one of the tape reels.

8. The device of claim 4 wherein the changing of the operational direction of the tape reels includes changing from a forward direction to a reverse direction or from the reverse direction to the forward direction.

9. The device of claim 7 wherein said winding unit further comprises a rack which is adapted to engage said tape reel driving gear.

10. The device of claim 9 wherein said winding unit includes a projection which fits into a groove on said pulling unit.

11. The device of claim 10 wherein said groove on said pulling unit is adapted to permit said rack to disengage from said tape reel driving gear.

12. The device of claim 11 further comprising a guide which guides said projection so as to engage said rack with said reel driving gear.

13. In a tape recording/reproducing device having tape reels, a motor, a pulley gear, a belt for transmitting rotational power from the motor to the pulley gear, a movable idler gear that moves between the tape reels due to a change of rotational direction of the pulley gear when an operational direction of the motor changes wherein the idler gear transmits rotational power from the pulley gear to one of the tape reels; a device for augmenting the movement of the idler gear between the tape reels when the operational direction of the motor changes, comprising:

a pulling unit engaging the idler gear;

a cam;

means for rotating said cam; and a lever connected to said pulling unit following said cam as said cam rotates;

wherein when the motor changes operational direction, said cam is rotated by said means for rotating said cam causing corresponding motion of said lever and wherein the motion of said lever actuates said pulling unit which augments the switch of the idler gear between the tape reels.

14. The device of claim 13 wherein said pulling unit includes a pulling unit hook engaging the idler gear.

15. The device of claim 13 wherein the idler gear includes an idler gear hook engaging said pulling unit.

16. The device of claim 13 further comprising tape reel driving gears which transmit rotational power from the idler gear to the tape reels.

17. The device of claim 13 wherein the changing of the operational direction of the motor includes changing from a forward direction to a reverse direction or from the reverse direction to the forward direction.

18. The device of claim 13 further comprising a guide for guiding said pulling unit.

19. In a tape recording/reproducing apparatus having tape reels and a motor for driving the tape reels, a spring actuated winding device for winding tape on one of the tape reels comprising:

a winding unit for winding the tape;

a plate;

a spring connected to said winding unit and said plate which is adapted to store elastic energy;

wherein said winding unit winds the tape onto one of the tape reels by driving the tape reel using stored elastic energy in said spring.

20. The device of claim 19 wherein said winding unit releases the stored elastic energy in said spring to wind the tape when said tape reels change operational direction.

21. The device of claim 19 further comprising a tape reel driving gear which translates power from said winding unit to one of the tape reels.

22. The device of claim 21 wherein said winding unit further comprises a rack engaging said tape reel driving gear.

23. The device of claim 22 wherein said winding unit includes a projection which fits into a groove on said plate.

24. The device of claim 23 wherein said groove on said plate permits said rack to disengage from said reel driving gear.

25. The device of claim 23 further comprising a guide which guides said projection so as to engage said rack with said reel driving gear.

26. In a tape recording/reproducing device having tape reels, a motor, a pulley gear, a belt for transmitting rotational power from the motor to the pulley gear, a movable idler gear that moves between the tape reels due to a change of rotational direction of the pulley gear when an operational direction of the motor changes wherein the idler gear transmits rotational power from the pulley gear to one of the tape reels; a method for preventing and correcting tape loosening comprising the steps of:

winding tape by driving a first of the two tape reels using stored elastic energy in a winding unit when the two tape reels change operational direction to correct tape loosening;

pulling an idler gear unit with a cam-actuated pulling unit when the two tape reels change operational direction to move the idler gear unit between the two tape reels to prevent tape loosening; and connecting the winding unit and the pulling unit with a spring to permit storage of elastic energy.

27. The method of claim 26 further comprising the step of engaging the idler gear unit using a pulling unit hook.

28. The method of claim 26 further comprising the step of engaging the pulling unit using an idler gear hook.

29. The method of claim 26 further comprising the step of transmitting rotational power from the winding unit to the first of the two tape reels with a tape reel driving gear.

30. The method of claim 26 wherein changing of the operational direction of the two tape reels includes changing from a forward direction to a reverse direction or from the reverse direction to the forward direction.

31. The method of claim 29 further comprising the step of meshing the tape reel driving gear with a rack.

32. The method of claim 31 further comprising the step of disengaging the rack from the tape reel driving gear by using a groove in the pulling unit and a projection on the winding unit.

33. The method of claim 31 further comprising the step of engaging the winding unit with the tape reel driving gear utilizing a guide which guides said projection to engage the rack with the tape reel driving gear.

* * * * *